(12) United States Patent
Chung

(10) Patent No.: US 11,281,790 B2
(45) Date of Patent: Mar. 22, 2022

(54) METHOD AND SYSTEM FOR DISTRIBUTED DATA STORAGE WITH ENHANCED SECURITY, RESILIENCE, AND CONTROL

(71) Applicant: Myota, Inc., Blue Bell, PA (US)

(72) Inventor: Jaeyoon Chung, Chesterbrook, PA (US)

(73) Assignee: Myota, Inc., Blue Bell, PA (US)

( * ) Notice: Subject to any disclaimer, the term of this patent is extended or adjusted under 35 U.S.C. 154(b) by 2 days.

(21) Appl. No.: 15/931,673

(22) Filed: May 14, 2020

(65) Prior Publication Data

US 2020/0372163 A1 Nov. 26, 2020

Related U.S. Application Data

(60) Provisional application No. 62/851,146, filed on May 22, 2019.

(51) Int. Cl.
*H04L 9/08* (2006.01)
*G06F 21/62* (2013.01)
(Continued)

(52) U.S. Cl.
CPC .......... *G06F 21/6218* (2013.01); *G06F 9/544* (2013.01); *G06F 16/164* (2019.01);
(Continued)

(58) Field of Classification Search
CPC .. G06F 21/6218; G06F 21/602; G06F 16/178; G06F 16/1748; G06F 16/1734; G06F 16/164; G06F 16/168; G06F 16/1824; G06F 2221/0755; G06F 3/067; G06F 3/0611; G06F 21/6209; G06F 16/1752; H04L 9/0631; H04L 9/0894;
(Continued)

(56) References Cited

U.S. PATENT DOCUMENTS

| 8,351,600 B2 | 1/2013 | Resch | |
| 8,356,050 B1 * | 1/2013 | Olston | G06F 16/986 |
| | | | 707/769 |

(Continued)

OTHER PUBLICATIONS

International Search Report for PCT/US2020/032781 dated Sep. 21, 2020.

(Continued)

*Primary Examiner* — David Garcia Cervetti

(57) ABSTRACT

A method and system for encrypting and reconstructing data files, including related metadata, is disclosed. The method involves separately encrypting data and metadata as chaining processes and integrating a plurality of encryption/encoding techniques together with strategic storage distribution techniques and parsing techniques which results in the integrated benefits of the collection of techniques. As disclosed, the content data is separated from its metadata, encryption keys may be embedded in the metadata, and in a content data encryption chaining process, the method chunks, encrypts, shards, and stores content data and separately shards and stores metadata, and stored in a flexible, distributed, and efficient manner, at least in part to assure improved resiliency In addition, the processes are preferably implemented locally, including at the site of the content data or a proxy server.

10 Claims, 11 Drawing Sheets

An example of the file encryption and the metadata encryption

(51) Int. Cl.
*G06F 21/60* (2013.01)
*G06F 16/178* (2019.01)
*G06F 16/174* (2019.01)
*G06F 16/17* (2019.01)
*G06F 16/16* (2019.01)
*G06F 9/54* (2006.01)
*H04L 9/06* (2006.01)
*G06F 16/182* (2019.01)

(52) U.S. Cl.
CPC .......... *G06F 16/168* (2019.01); *G06F 16/178* (2019.01); *G06F 16/1734* (2019.01); *G06F 16/1748* (2019.01); *G06F 16/1824* (2019.01); *G06F 21/602* (2013.01); *H04L 9/0631* (2013.01); *G06F 2221/0755* (2013.01)

(58) Field of Classification Search
CPC ..... H04L 2209/38; H04L 9/14; H04L 9/0822; H04L 9/085
See application file for complete search history.

(56) References Cited

U.S. PATENT DOCUMENTS

| | | | |
|---|---|---|---|
| 8,468,132 B1* | 6/2013 | O'Neill | G06F 16/27 707/622 |
| 8,478,937 B2* | 7/2013 | Grube | G06F 3/0685 711/114 |
| 8,607,122 B2* | 12/2013 | Resch | G06F 11/073 714/763 |
| 8,667,273 B1* | 3/2014 | Billstrom | H04L 63/0428 713/165 |
| 8,751,460 B1* | 6/2014 | Annapragada | G06F 16/951 707/684 |
| 8,825,752 B1* | 9/2014 | Madhavan | G06F 11/3485 709/203 |
| 8,903,973 B1* | 12/2014 | Hindawi | H04L 45/16 709/223 |
| 8,918,534 B2 | 12/2014 | Baptist | |
| 8,918,897 B2* | 12/2014 | Resch | H04L 9/085 726/27 |
| 8,935,318 B1* | 1/2015 | Konerding | G06F 9/452 709/203 |
| 9,053,124 B1* | 6/2015 | Dornquast | G06F 11/1453 |
| 9,128,877 B1* | 9/2015 | Cousins | H03M 13/616 |
| 9,195,826 B1* | 11/2015 | Fang | G06F 21/56 |
| 9,203,625 B2* | 12/2015 | Motwani | G06F 21/00 |
| 9,225,691 B1* | 12/2015 | Balasubramanian | H04L 63/0428 |
| 9,231,768 B2* | 1/2016 | Resch | H04L 63/12 |
| 9,251,097 B1* | 2/2016 | Kumar | G06F 21/602 |
| 9,405,926 B2 | 8/2016 | Lewis | |
| 9,413,529 B2* | 8/2016 | Resch | H04L 9/14 |
| 9,454,431 B2* | 9/2016 | Grube | G06F 16/182 |
| 9,483,486 B1* | 11/2016 | Christiaens | G06F 16/1748 |
| 9,483,657 B2 | 11/2016 | Paul et al. | |
| 9,678,968 B1* | 6/2017 | Taylor | G06F 3/0608 |
| 9,678,981 B1* | 6/2017 | Taylor | G06F 16/122 |
| 9,679,040 B1* | 6/2017 | Davis | G06F 16/1827 |
| 9,774,401 B1* | 9/2017 | Borrill | H04L 9/0852 |
| 9,871,770 B2* | 1/2018 | O'Hare | G06F 21/606 |
| 9,876,637 B2* | 1/2018 | Gauda | H04L 63/0428 |
| 9,881,177 B2* | 1/2018 | O'Hare | H04L 9/085 |
| 9,979,542 B2* | 5/2018 | Androulaki | H04L 9/0861 |
| 10,009,732 B1* | 6/2018 | Rice | H04W 4/029 |
| 10,043,017 B2 | 8/2018 | Lewis | |
| 10,148,548 B1* | 12/2018 | Griffin | H04L 41/142 |
| 10,198,492 B1* | 2/2019 | O'Neill | G06F 16/27 |
| 10,216,754 B1* | 2/2019 | Douglis | G06F 16/1744 |
| 10,229,127 B1* | 3/2019 | Shang | G06F 12/0833 |
| 10,268,835 B2* | 4/2019 | Beckman | H04L 67/42 |
| 10,331,695 B1* | 6/2019 | Stickle | G06F 16/27 |
| 10,496,611 B1* | 12/2019 | Singh | G06F 16/185 |
| 10,783,269 B1* | 9/2020 | Shraer | H04L 9/3242 |
| 10,838,990 B1* | 11/2020 | Shilane | G06F 16/316 |
| 10,931,450 B1* | 2/2021 | Chellappa | H04L 9/0894 |
| 11,030,697 B2* | 6/2021 | Erard | G06Q 40/08 |
| 11,212,107 B2* | 12/2021 | Beecham | G06F 16/27 |
| 2005/0097318 A1 | 5/2005 | Bolosky | |
| 2006/0026425 A1 | 2/2006 | Douceur et al. | |
| 2007/0160198 A1* | 7/2007 | Orsini | G06F 21/62 380/28 |
| 2007/0239716 A1* | 10/2007 | Weininger | G06F 16/335 |
| 2008/0082551 A1 | 4/2008 | Farber | |
| 2009/0037500 A1* | 2/2009 | Kirshenbaum | G06F 16/137 |
| 2009/0070752 A1* | 3/2009 | Alpern | G06F 8/443 717/148 |
| 2009/0177894 A1* | 7/2009 | Orsini | H04L 9/321 713/193 |
| 2009/0271762 A1* | 10/2009 | Taylor | G06Q 10/10 717/107 |
| 2009/0319772 A1* | 12/2009 | Singh | G06F 21/6218 713/153 |
| 2010/0299313 A1* | 11/2010 | Orsini | H04L 63/20 707/652 |
| 2011/0196855 A1* | 8/2011 | Wable | G06F 16/24554 707/711 |
| 2011/0246817 A1* | 10/2011 | Orsini | G06F 21/60 714/6.1 |
| 2011/0289383 A1* | 11/2011 | Dhuse | H04L 9/085 714/763 |
| 2011/0289565 A1* | 11/2011 | Resch | H04L 63/083 726/5 |
| 2011/0296440 A1* | 12/2011 | Launch | G06F 21/72 719/326 |
| 2012/0016633 A1* | 1/2012 | Wittenstein | G06F 21/552 702/180 |
| 2012/0072723 A1* | 3/2012 | Orsini | H04L 63/10 713/165 |
| 2012/0173882 A1* | 7/2012 | Horn | G06F 21/78 713/189 |
| 2012/0185448 A1* | 7/2012 | Mensch | G06F 16/1834 707/693 |
| 2012/0197917 A1 | 8/2012 | Koifman | |
| 2012/0198241 A1* | 8/2012 | O'Hare | G06F 21/602 713/189 |
| 2012/0204024 A1* | 8/2012 | Augenstein | G06F 21/602 713/150 |
| 2012/0222134 A1* | 8/2012 | Orsini | H04L 67/108 726/28 |
| 2012/0226904 A1 | 9/2012 | Orsini | |
| 2012/0311557 A1* | 12/2012 | Resch | G06F 11/2089 717/171 |
| 2012/0331088 A1* | 12/2012 | O'Hare | G06F 21/6227 709/214 |
| 2013/0041872 A1* | 2/2013 | Aizman | G06F 16/182 707/690 |
| 2013/0047057 A1* | 2/2013 | Resch | H04L 9/3263 714/799 |
| 2013/0054979 A1* | 2/2013 | Basmov | G06F 12/1408 713/193 |
| 2013/0086642 A1* | 4/2013 | Resch | G06F 11/00 726/4 |
| 2013/0103945 A1* | 4/2013 | Cannon | G06F 21/6209 713/168 |
| 2013/0124574 A1* | 5/2013 | Brettin | G16B 50/20 707/798 |
| 2013/0151761 A1* | 6/2013 | Kim | G06F 21/78 711/103 |
| 2013/0159251 A1* | 6/2013 | Skrenta | G06F 16/2282 707/612 |
| 2013/0232503 A1* | 9/2013 | Volvovski | G06F 9/50 718/104 |
| 2013/0238900 A1* | 9/2013 | Leggette | G06F 11/1451 713/165 |
| 2013/0246812 A1* | 9/2013 | Resch | G06F 12/1408 713/193 |
| 2013/0283095 A1* | 10/2013 | Dhuse | H04L 9/0869 714/6.22 |

(56) References Cited

U.S. PATENT DOCUMENTS

| | | | |
|---|---|---|---|
| 2013/0304694 A1* | 11/2013 | Barreto | G06F 11/2023 707/608 |
| 2013/0304746 A1* | 11/2013 | Dhuse | G06F 11/1096 707/743 |
| 2013/0305039 A1* | 11/2013 | Gauda | H04L 67/1097 713/153 |
| 2014/0006357 A1* | 1/2014 | Davis | G06F 16/182 707/667 |
| 2014/0013112 A1* | 1/2014 | Cidon | G06F 16/137 713/165 |
| 2014/0025948 A1* | 1/2014 | Bestler | H04L 9/0863 713/167 |
| 2014/0068791 A1* | 3/2014 | Resch | G06F 21/60 726/30 |
| 2014/0082376 A1* | 3/2014 | Roden | G06F 21/602 713/193 |
| 2014/0115334 A1* | 4/2014 | Resch | H04L 9/085 713/168 |
| 2014/0123115 A1* | 5/2014 | Peretz | G06F 11/362 717/127 |
| 2014/0157370 A1* | 6/2014 | Plattner | G06F 21/6245 726/4 |
| 2014/0229731 A1* | 8/2014 | O'Hare | G06F 21/6227 713/165 |
| 2014/0281513 A1* | 9/2014 | Kitze | H04L 9/0897 713/165 |
| 2014/0297776 A1* | 10/2014 | Volvovski | G06F 16/182 709/212 |
| 2014/0337491 A1* | 11/2014 | Barreto | G06F 16/182 709/221 |
| 2014/0351528 A1* | 11/2014 | Motwani | H04L 9/0894 711/156 |
| 2014/0359276 A1* | 12/2014 | Resch | H04L 63/061 713/153 |
| 2015/0026454 A1* | 1/2015 | Boeuf | G06F 3/0665 713/152 |
| 2015/0088842 A1* | 3/2015 | de la Torre | G06F 11/141 707/692 |
| 2015/0095351 A1* | 4/2015 | Balikov | G06F 16/24549 707/752 |
| 2015/0154418 A1* | 6/2015 | Redberg | G06F 21/6218 713/165 |
| 2015/0178007 A1* | 6/2015 | Moisa | G06F 16/25 713/190 |
| 2015/0186043 A1* | 7/2015 | Kesselman | G06F 3/067 711/162 |
| 2015/0213358 A1* | 7/2015 | Shelton | H04L 41/0604 706/47 |
| 2015/0227757 A1* | 8/2015 | Bestler | H04L 9/3239 713/167 |
| 2015/0242272 A1* | 8/2015 | Resch | G06F 11/1076 714/764 |
| 2015/0242273 A1* | 8/2015 | Resch | G06F 21/62 714/763 |
| 2015/0271284 A1* | 9/2015 | Hindawi | H04L 67/32 709/213 |
| 2015/0293817 A1* | 10/2015 | Subramanian | G06F 11/1448 707/645 |
| 2015/0319244 A1* | 11/2015 | Resch | G06F 3/061 714/766 |
| 2015/0356305 A1* | 12/2015 | Volvovski | H04L 67/10 713/164 |
| 2015/0363611 A1* | 12/2015 | Redberg | G06F 16/164 713/165 |
| 2016/0085839 A1* | 3/2016 | D'Halluin | G06F 16/21 707/747 |
| 2016/0154851 A1* | 6/2016 | Sugaya | G06F 16/2228 707/741 |
| 2016/0154963 A1* | 6/2016 | Kumar | G06F 21/602 713/189 |
| 2016/0196440 A1 | 7/2016 | O'Hare et al. | |
| 2016/0224638 A1* | 8/2016 | Bestler | H04L 12/1854 |
| 2016/0277373 A1* | 9/2016 | Murray | H04L 63/0876 |
| 2016/0292429 A1* | 10/2016 | Manville | G06F 16/1748 |
| 2016/0350171 A1* | 12/2016 | Resch | G06F 3/0619 |
| 2016/0350329 A1* | 12/2016 | Resch | G06F 3/0644 |
| 2016/0350551 A1* | 12/2016 | Chang | G06F 3/0623 |
| 2016/0373421 A1* | 12/2016 | Panchapakesan | H04L 63/0428 |
| 2017/0005797 A1 | 1/2017 | Lanc et al. | |
| 2017/0032139 A1* | 2/2017 | Resch | G06F 11/108 |
| 2017/0048021 A1* | 2/2017 | Yanovsky | H04L 63/1458 |
| 2017/0103116 A1* | 4/2017 | Hu | G06F 16/278 |
| 2017/0104736 A1* | 4/2017 | Seul | H04L 9/085 |
| 2017/0163418 A1 | 6/2017 | Lan et al. | |
| 2017/0177883 A1* | 6/2017 | Paterra | H04L 9/0822 |
| 2017/0178069 A1* | 6/2017 | Paterra | H04L 63/061 |
| 2017/0180368 A1* | 6/2017 | Paterra | H04L 63/0435 |
| 2017/0272100 A1 | 9/2017 | Yanovsky et al. | |
| 2017/0272209 A1* | 9/2017 | Yanovsky | H03M 13/13 |
| 2018/0063090 A1* | 3/2018 | Resch | H04L 63/0428 |
| 2018/0351740 A1* | 12/2018 | Gray | H04L 9/14 |
| 2018/0367509 A1* | 12/2018 | O'Hare | H04L 9/3226 |
| 2019/0036648 A1* | 1/2019 | Yanovsky | G06F 3/0623 |
| 2019/0081783 A1* | 3/2019 | Bohli | H04L 9/0822 |
| 2019/0109711 A1* | 4/2019 | Gladwin | H04L 9/0869 |
| 2019/0156045 A1 | 5/2019 | Lewis | |
| 2019/0207910 A1 | 7/2019 | Darling et al. | |
| 2019/0356416 A1* | 11/2019 | Yanovsky | G06F 3/067 |
| 2020/0119917 A1* | 4/2020 | Christensen | H04L 9/3255 |
| 2020/0137035 A1 | 4/2020 | Evans et al. | |
| 2020/0143074 A1* | 5/2020 | Steinberg | G06F 21/6218 |
| 2020/0162246 A1* | 5/2020 | Schouppe | H04L 9/085 |
| 2020/0193035 A1* | 6/2020 | Andreu | G06F 21/78 |
| 2020/0193048 A1 | 6/2020 | Evans et al. | |

OTHER PUBLICATIONS

Written Opinion for PCT/US2020/032781—dated Sep. 21, 2020.
Jason K. Resch, et al., "AONT-RS: Blending Security and Performance in Dispersed Storage Systems", pp. 1-12.
Katarzyna Kapusta, et al., "Data protection by means of fragmentation in various different distributed storage systems", Jun. 20, 2017, pp. 1-36.
Mark W. Storer, et al., "POTSHARDS—A Secure, Recoverable, Long-Term Archival Storage System", ACM Transactions on Storage, vol. 5, No. 2, Article 5, pp. 5:1-5:35, Jun. 2009.
S. A. Weil, et al., "Ceph: A Scalable, High-performance Distributed File System", 7th Symposium on Operating systems design and implementation (OSDI), Nov. 2006.
KyoungSoo PARK, et al., "Supporting practical content-addressable caching with CZIP compression", Proceedings of the 2007 USENIX Annual Technical Conference, Santa Clara, CA, USA, Jun. 17-22, 2007.

* cited by examiner

Event log collection and training

File and Metadata/Key Encryption Chain.

System components and interactions

Blacklist lost client and configure new client

Metadata encoding while preserving basic file attributes

An example of the file encryption and the metadata encryption

METHOD AND SYSTEM FOR DISTRIBUTED DATA STORAGE WITH ENHANCED SECURITY, RESILIENCE, AND CONTROL

CROSS-REFERENCE TO RELATED APPLICATION

This application claims priority to U.S. Provisional Patent Application No. 62/851,146, filed May 22, 2019, the entirety of which is incorporated by reference.

BACKGROUND OF THE PRESENT INVENTION

Protecting data is a well-known problem in the storage technology area in terms of security and resilience. There are well-known solutions such as Erasure Code, which is widely used for CDs, DVDs, QR Codes, etc., to improve the ability of error correction over prior solutions, and Shamir's Secret Sharing Scheme (SSSS) which protects a secret with a polynomial interpolation technique. Their (t, n) threshold property requires at least t data pieces called shares (or shards) from n to reconstruct original data. Like n replicated copies, but introducing an additional constraint t, this property improves data resilience when reconstructing the original because it allows n-t storage node failures without service interruption. From the perspective of data protection, the (t, n) threshold property also reveals the original data only if at least t shares are accessible and valid.

Erasure Code has a goal of correcting bit errors within the data with maximizing transmission or storage efficiency. Thus, most applications are based solely on Erasure Code such as Reed-Solomon (RS) Code. In computer storage, Erasure Code has been used to implement Redundant Array of Independent Disks (RAID), specifically levels 5 and 6, which are designed for a reliable storage component under different levels of failures.

A large-scale data storage system causes a new technical challenge, i.e., managing and protecting metadata. To achieve flexibility and scalability, data is stored to distributed storages along with its metadata, where the metadata includes information regarding where the required data pieces are located. Thus, to store metadata reliably and securely, another layer of data protection is ordinarily necessary.

For example, Shamir's Secret Sharing Scheme (SSSS) and RS have been used to respectively protect security and error correction of data, even though SSSS and RS Code have the (t, n) threshold property, which requires at least t data shares from n to reconstruct original data. They aim at cryptography and error correction respectively.

SSSS is designed as a cryptography technique that stores a secret into multiple shares, n, without use of an encryption key. SSSS leverages polynomial interpolation which guarantees theoretical cryptography, so no methodology has been known to break SSSS with less than t shares.

RS Code also has the same (t, n) threshold property, but is designed for error correction and storage efficiency. Unlike SSSS, RS Code uses a linear mapping such that $C(x)=x \cdot A$, where code word vector $x=(x_1, \ldots, x_t) \in F^t$ and A is a (t×n)-matrix which is usually the transpose of a Vandermonde matrix. Thus, $C: F^t \rightarrow F^n$. There are several variations of RS Code, but original RS code can be categorized into systematic code and non-systematic code. A systematic code designs matrix A to keep the original data plus extra parities, which reduces decoding cost. A non-systematic code does not contain original data, but still does not guarantee data security to the level of SSSS. RS Code has a benefit for data storage. For example, SSSS requires B*n storage space, but RS Code requires B*n/t, where B is the size of original data.

Distributed data storage has emerged due to its scalability and cost efficiency. One of the well-known distributed data storage systems is Hadoop File System (HDFS), which is designed for a very large data center storage system to execute parallel data workload, such as for MapReduce. HDFS suggested 3-duplicate copies of data: two are stored to two different nodes in the same rack, and another is stored to a different node in a different rack (location). This strategy simply improves data accessibility by leveraging failure locality. More recently, object storage solutions have been used to simplify I/O query using key and value pairs.

There are immediate challenges for distributed storage systems. The first challenge is related to metadata management. Since the data contents are distributed into multiple storage nodes, addresses of the distributed contents must be maintained in a secure and reliable place, which becomes the single point of failure and a performance bottleneck. Storing metadata significantly impacts system performance because it is mostly related to a directory service and metadata lookup operations, where the performance bottleneck exists. For example, List and Stat are more frequently called than Read and Write. Ceph[1] proposed how to build a metadata server farm and the location of metadata in order to distribute metadata request queries among the servers more efficiently. The hash function of Ceph was designed to minimize shared paths of metadata queries in a server farm.

[1] [1] S. A. Weil, S. A. Brandt, E. L. Miller, D. D. E. Long, and C. Maltzahn, "Ceph: A Scalable, High-performance Distributed File System", 7th Symposium on Operating systems design and implementation (OSDI). November, 2006.

Not only is the performance an issue, but also security and resilience, as a result of metadata decoupling, are challenging topics. Protecting metadata with data encryption techniques causes extra computational costs and performance degradations.

Importantly, in prior solutions, storage and retrieval occur under a synchronous protocol, whereas in the present invention storage and retrieval, as detailed below occur asynchronously.

Another challenge is the limitation of architectural flexibility for an end-to-end solution. Most distributed storage systems are designed for clients in the same data center whose network latency is approximately less than 1 ms, which adversely impacts multi-data center solutions. For example, if we took a client-centric architecture, where client devices are mobile, a client device might be connected to storage nodes and metadata server nodes through the Internet. Since the client is mobile or located outside of the data center, the system performance is not comparable with the storage services inside the data center.

BRIEF DESCRIPTION OF THE PRESENT INVENTION

The present application is directed to a method and system to separately encrypt data and metadata as chaining processes using a network equipped device and network equipped storage nodes for secure storage, where the process and the system are both reliable and resilient beyond levels currently available. The method and system of the present invention integrate a variety of encryption/encoding techniques together with strategic storage techniques and parsing techniques which results in the integrated benefits of the collection of techniques. The present invention separates content data from its metadata and in a content data encryption chaining process, the present invention chunks, encrypts, shards, and stores content data and separately shards and stores metadata, where the metadata is augmented with information related to the content data encryption chaining process. The method of the present invention uses both computational and theoretical cryptography. In addition, the processes are preferably implemented locally, including at the site of the content data or a proxy server.

In the preferred embodiment, content data is chunked then each chunk is encrypted with a randomly generated key-based AES-256 (or equivalent), then RS encoded (or equivalent), then broken into shards, or "sharded", where shards are file portions formed by parsing the file following encryption and encoding. Metadata is modified by introducing chunk IDs which are SSSS encrypted, then sharded in combination with key shards, then SSSS encrypted key shards are introduced during the metadata encryption process. It is important to note that we are using at least two encryption methods: (1) AES+RS to make data shards; and (2) SSSS for Chunk IDs and AES Keys which are stored in Metadata shards.

In brief, the present invention includes multiple forms of encrypting plus encoding, plus distributed storage of the encrypted (and for some data, also encoded) files.

The methodology allows for improved security and resilience over prior solutions, allows for more rapid recovery, and is also controllable based on a user's preference for storage management and configuration for data access control.

DETAILED DESCRIPTION OF THE PRESENT INVENTION

Figure 1:
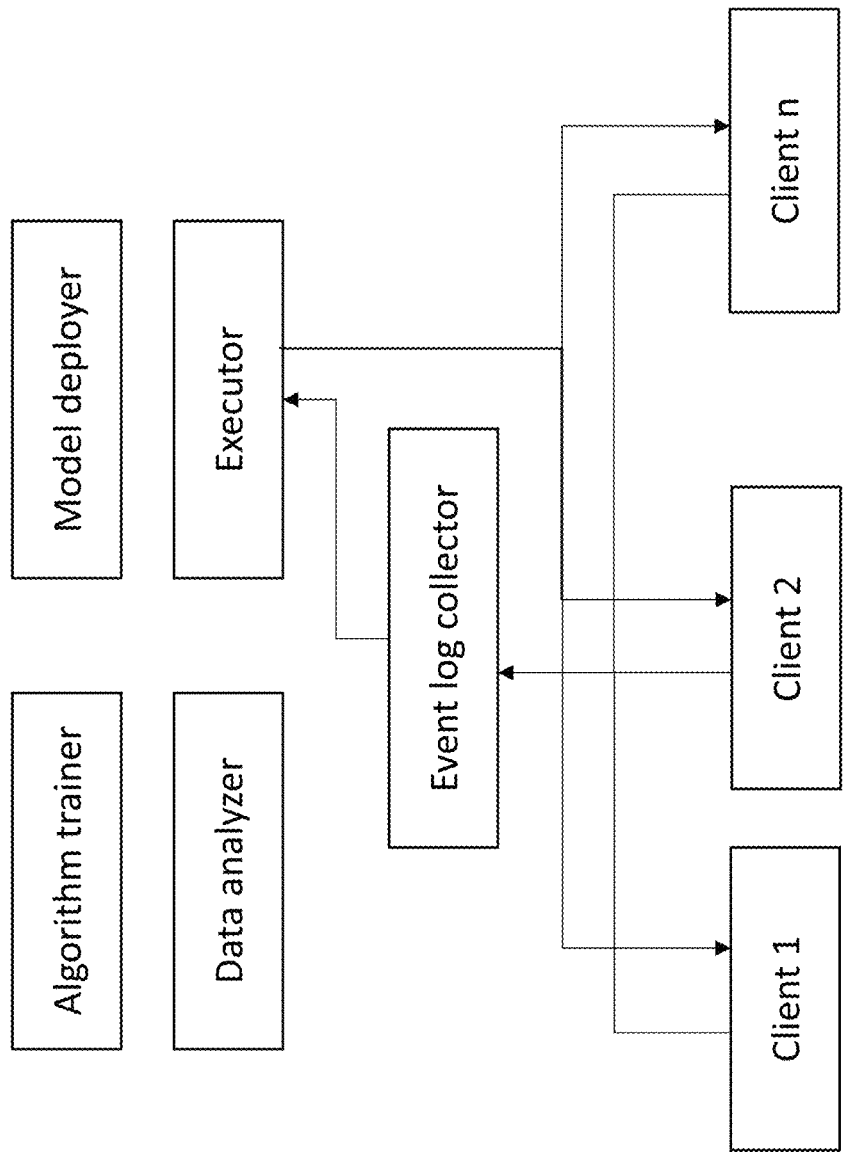
FIG. 1 shows Inference and event detection of the present invention particularly showing inference and event detection.

The present invention solves the aforementioned encryption/storage challenge by using a combination of a data encryption chain module, based at least in part on computational cryptography for data encryption/encoding, and a different metadata/key encryption chain module, which follows the data encryption chain module with theoretical cryptography. While others also store and configure metadata separately from content data, they merely focus only on storing content and metadata separately and do not include many significant and beneficial attributes and approaches as described herein. Reliability and security are traditional priorities of content stores/storages. Reliability and load balancing are also significant priorities of metadata/key stores/storages. This invention advances the art by implementing a practical implementation of content data and metadata/key encryption in separately (yet interrelatedly) chaining processes using at least computational cryptography for content, and at least theoretical cryptography for metadata/key, thereby implementing an architecture previously unused for secure storage. This solution, among other benefits, provides a significant improvement in speed, resiliency and recovery, and security for an individual user, for a "group" user (such as a business with common storage), and for a multi-data center user (such as a user with multiple data centers at the backend of a service), thereby concurrently serving a plurality of user types. Compared with computational cryptography, some encryption algorithms are proved as theoretical cryptography algorithms that are not breakable by attackers mathematically. The computational cryptography algorithms used are determinable based on the amount of time to reverse the original data which is long enough in practice for the approach in use. On the other hand, theoretical cryptography algorithms afford solutions whereby breaking the encrypted data is mathematically impossible without satisfying required conditions.

Definitionally, we use the word "encoding" for situations where we generate data shards from each encrypted chunk using RS Code (or equivalent), and we use "encrypting" for SSSS (or equivalent) and/or chunk encryption. The term "chunking" is used in the context of splitting a file into multiple pieces without any manipulations. The term "sharding" is used when the output has a (t, n) threshold property. Encoding an encrypted chunk into data shards retains the encryption in the output. A "metadata shard" is defined as data containing encrypted chunk IDs and file attributes. A "key shard" is defined as encrypted data of each chunk encryption key using SSSS or equivalent. The present application defines client as a user-facing device such as desktop, laptop, handheld device, etc. The extended definition of a client includes server machines that are located in the user domain.

In the present invention, data is first chunked, encrypted, and then sharded. Metadata and content data are separately encrypted and encoded and separately stored. The encryption/encoding scheme of the present invention dramatically improves storage efficiency, data resilience, and security, in part based on the encryption scheme, encoding scheme, and storage scheme, and how the metadata remains accessible to an authorized user. The method of the present invention maintains or improves system reliability—meaning prevention from such as physical or cyber-attack, and resiliency, meaning the ability to recover files subsequent to file damage.

The approach of the present invention includes a novel system architecture for encryption and storage and a novel encryption and encoding approach to both content and to metadata. Improvements provided by these approaches include, but are not limited to overcoming latency in remote storage; advances in storage distribution techniques using AI (artificial intelligence); advantages with monitoring, control, and management of unstructured data among others.

The solution creates two separate encryption chains: file content and its metadata/key each separately encrypted, each using different approaches with the file content further including encoding. The file content encoding algorithm includes performance-intensive information dispersion algorithms (known as a computational cryptography algorithm), such as but not limited to RS Coding, performed only after the content has already been encrypted using algorithms, for example well-known algorithms such as AES-256. In the process of the file content encoding, one or more randomly generated encryption keys and potentially including nonces (including initialization vectors, typically randomly selected in the present invention) are used to encrypt a file. To store the encryption key securely, the key is stored in the metadata file, or separately, instead of how it is commonly done—storing it together with the data shards. This separation of the encryption key from the content data protects content data from an attacker even if the attacker already seized the data storage access permission and/or somehow obtains the key. Since in the present invention the metadata becomes amended to include additional significant information, the present invention applies a security-intensive information dispersion algorithm (known as a theoretical cryptography algorithm) to the metadata. The present invention encrypts each reference of chunks (chunk IDs) and uses an encryption key only using SSSS or equivalent. The theory of SSSS guarantees that metadata reconstruction is available only when a sufficient number (>=2 in the example) of shards is available for reconstruction.

Compared with prior approaches, the present solution solves existing challenges and improves system performance, while concurrently reducing traditional storage needs. The most significant goal that storage systems need to achieve is data availability, resiliency, and reliability. The most common solution to improve data availability and resilience is data backup that ordinarily requires at least double data storage space in order to store redundant data. The present invention requires less—typically n/t times the storage space is needed where t is required number of shards and n is the total number of stored shards. By only needing t out of n instead of n out of n, resiliency dramatically improves. In prior solutions, RAID (Redundant Array of Independent Disks) improves storage efficiency while guaranteeing almost the same resilience to data backup by adding error correction code to the data. These once state-of-the-art storage solutions (preceding the present invention) use distributed storage nodes in order to achieve both availability and recovery. They leverage error correction code such as Erasure Code and store data pieces into distributed storage nodes, which allows a certain number of storage node failures based on encoding parameters. However, these solutions are directed to merely the independent storage of metadata and content data.

The present invention decouples metadata/key storage from content data storage, but retains an association between the two. In addition, the present solution provides for optimal and improving-over-time configuration for diverse storage backends for users to attach different types of backend storages such as cloud storage services from different vendors and a user's own storage nodes. That is, the present invention is storage type (and location) agnostic, even in storage of a single computer/user's storage, and allows for simultaneous use of multiple storage types. This approach provides an added benefit as previous solutions were not designed to or successfully achieved orchestration of diverse backend storages. Because of the diversity of backend storages, configuration to improve system performance and efficiency is a sophisticated task that would ordinarily have to be done by an expert, thereby adding insecure layers and risk to prior solutions. An orchestration layer in the present solution provides an abstraction of the configuration tasks, optionally with an AI-assisted optimization module. The optimal configuration includes, but is not limited to cost optimization, storage efficiency, security improvement, simplifying policy configuration, advanced monitoring metrics and alert management.

The present solution also reduces latency of metadata operations in long latency networks, at least in part by how the metadata is configured for storage and how storage is selected. In prior solutions, in general, because of the storage approaches used, recovery latency is a major issue. Frequent lookups of file directory and file stat information are needed to keep file system integrity as well as to keep file data operations current. That is, remote backup is performed regularly and automatically, not just once, and the stored content and metadata are updated. Thus, metadata operations performance is directly related to overall system performance and user experience. Since distributed storage solutions require operations to lookup metadata, the metadata servers deployed beyond long latency networks become a bottleneck related to system performance. Compared with previous inventions, the present solution is intended for using backend storages in long latency networks, such as the Internet, without performance degradation. The present solution reduces the latency of metadata operations by separating operation attributes and content references, which are stored in distributed metadata storages including potential storage in local machine.

The present solution further improves the user experience related to file content operations, such as Read and Write, in long latency networks by implementing an asynchronous approach. Ordinarily, long latency networks negatively impact performance of file content operations. Performance depends on the bottleneck link, which often is in the network between the user device and backend storages. In the context of the present invention, the user device may be a server, a hand-held device, or a stand-alone computer which equips networking interface to storage of a user's data, where a user may be an individual or a group (such as a corporation). The typical synchronous approach negatively impacts on user experience directly because users have to wait for responses from backend storages in the long latency network. The present solution uses an asynchronous approach to absorb the delay between user device and backend storages in long latency networks. Instead of waiting for responses from backend storages, this approach returns responses early, particularly if the request is staged locally as an intermediate state, scheduled to synchronize as a batch process so the results are updated asynchronously later.

The following are additional unique and novel solutions of the present invention to solve the aforementioned challenges, overcoming limitations of how others store data.

Artificial Intelligence (AI)-assisted optimal configuration.

Figure 2:
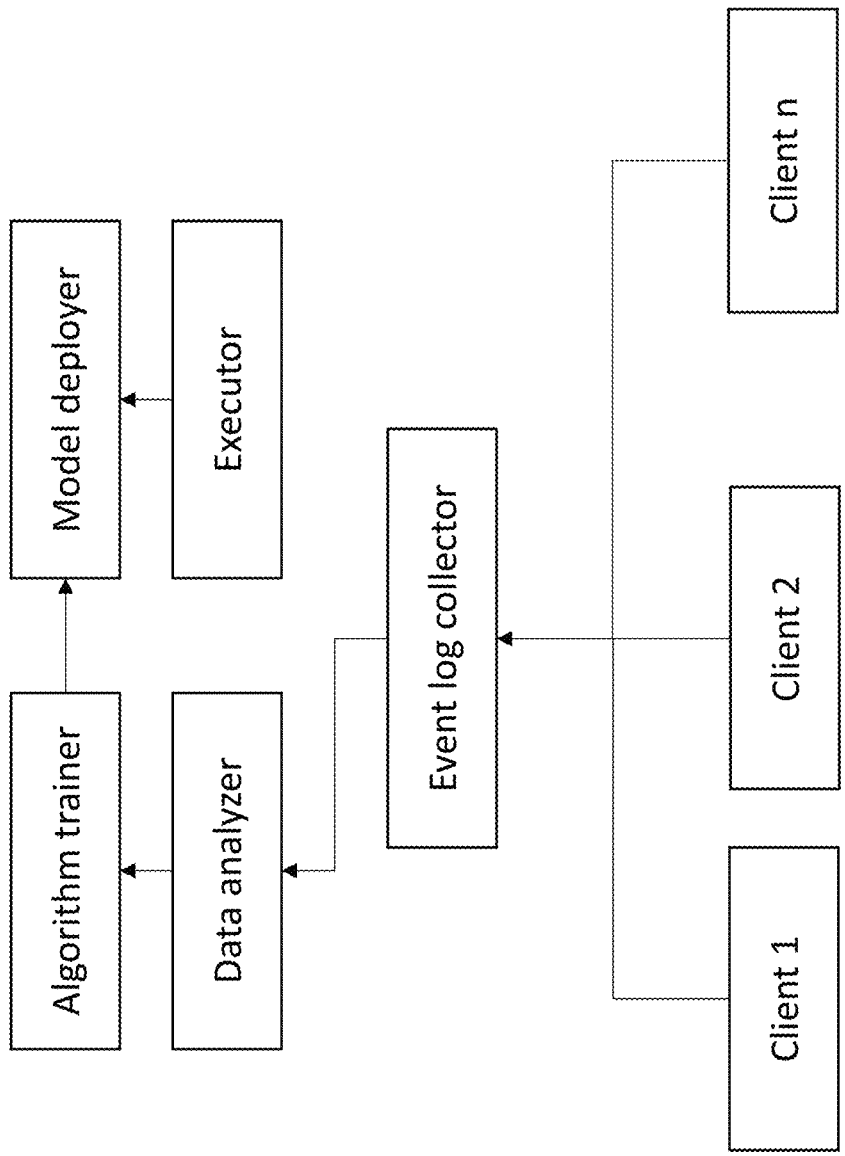
FIG. 2 shows event log collection and training of the present invention.

The present invention optimizes the backend configuration using AI to provide an abstracted level of control to diverse backend storages and configurations. The present solution provides human-friendly interfaces (including a Graphical User Interface, GUI, and/or a file system interface) and languages which act as an interpreter and as an inference module to derive a detailed storage configuration. See FIG. 1. Applications of AI includes, but are not limited to (i) optimizing storage cost with optimal data allocation, (ii) optimizing data access latency based on user data access pattern and location information of user and storage, and (iii) an enhanced level of security by changing the number of shards for data reconstruction dynamically. In using AI algorithms, the present solution collects anonymized logs from file operation events of users. See FIG. 2. The file operation event logs may be stored for analysis by a pattern analyzer so as to train AI algorithms. Once the algorithms are trained, the models and parameters are deployed to AI-assisted modules where the algorithms are actually executed. AI-assisted modules receive events from user devices to perform optimal configuration, abnormality detection, etc. Data locations are kept within the stored and encrypted metadata and are updated based upon AI-based adjustments.

Additional sample AI applications in the context of the present invention include:

(1) Optimal Storage Selection—Performance

The system collects upload and download events relative to storage (and potentially more general access) to measure empirical speed for each backend storage. When storing shards and assuming a greater number of storages than number of shards to store, the system stores more shards to faster backend storages to minimize data store latency. Because the latency is determined by the bottleneck at the slowest storage, a min-max algorithm, which minimizes maximum value of shard store latency for each storage, reduces entire data upload latency. When fetching shards to reconstruct a file, the min-max algorithm also selects fast t storages out of n total where the shards are stored to minimize maximum latency at each storage.

(2) Optimal Storage Selection—Cost

The system collects file access frequency to migrate least accessed files to cold storages. For the sake of discussion, assuming there are two-tiered storages, i.e., hot storages, fast but expensive, and cold storages, slow but cost effective. Existing services provide simple policy for storage locales based on the time to store or last access to determine data to migrate into cold storages. Because this invention stores n shards and requires t out of n to reconstruct original data, the decision is not a binary choice, cold or hot, but how many shards or how much of portions of shards, or which shards, are directed to cold and hot storages. The system of the present invention regularly collects shard access events and frequency to calculate estimated cost of storage, including cold storage migration costs. The system of the present invention reduces the configuration complexity when considering multiple parameters from different type of storages. Considering performance metrics together, the algorithm is able to subsequently migrate data from cold to hot storages based on the shard access pattern.

(3) Abnormal File Access Detection

Autocorrelation is one characteristic in the workload of networked systems which may be applied in the present invention. For example, network traffic studies show regular (such as daily) patterns based on temporal and spatial similarity of traffic source and destination. In one embodiment of this invention, the system uses autocorrelation based on file access patterns that mostly shows daily and weekly similarity. This characteristic allows us to develop a prediction algorithm using deep learning and regression methods. Thus, the system can determine irregularities or deviations from patterns, such as irregularities or deviations with statistical significance and can therefore alert abnormal file access by malicious users or malwares to a system administrator.

Reduced Latency of Metadata Operations in Long Latency Networks.

Since the present solution stores shredded pieces of files to multiple backend storages, metadata is enhanced with information needed to reconstruct the original files. Metadata ordinarily would also store file attributes such as file size, modification time, access time, etc. Based on the observation of frequency of file operation calls, we have observed that metadata operations are more frequently called than file content operations are called. Consequently and in addition, file systems are designed assuming the latency of metadata operations is short. Thus, previous solutions required metadata storages (or servers) in local area networks which results in unnecessary risk of loss due to failure. However, the present solution designs metadata to be applicable into long latency networks while keeping the properties of distributed data encryption. The metadata of the present solution is comprised of the "replicated" data and the "encrypted" data (see FIG. 10). The replicated data contains the information that does not relate to the content of a file. File name, size, modified time, and other file attributes are stored in the replicated data. It allows the system to obtain the data without collecting multiple metadata shards and decrypting the data. On the other hand, the information related to file content, chunk IDs and chunk encryption keys, is stored as encrypted data. To keep the property of distributed encryption for the metadata and the encryption keys, the present solution uses SSSS or equivalent that achieves stronger security level of metadata than that than that needed in the present invention for file content. Because SSSS does not require an encryption key, decryption requires only the collection of multiple data shards. Thus, the present invention leverages distributed storages, with diverse authentication and security solutions provided by storage solution, as the root of trust.

Distributing metadata shares using the separation of replicated data and encrypted data also improves performance of metadata operations by storing one of encoded metadata shards into a local device such as user device or metadata server in LAN. In addition, it allows the present solution to store metadata shares in different locations as redundant copies as well as encrypted data shares.

OpenDir and Stat—metadata operation example. When a user opens a directory, the file system should return a list of its children's information, i.e., files and directories. To list each child's information of the target directory, metadata storage needs to provide a metadata selection function based on object name or prefix. The present invention can implement the directory system using a native directory structure, a key-value storage, and/or a database system. Because one set of metadata shares is stored locally, identifying children directories and files is performed without remote metadata files. That is, a present user can "unlock" the metadata stored on the local device and identify only those files they wish to recover.

As to the following operation, Stat operation should return file attributes which are stored in the set of metadata shares as replicated data. Thus, Stat operation is implemented in a lightweight way, i.e., looking up the corresponding metadata share stored in the local device.

Read—file content operation example. Because in the present invention chunk IDs are encrypted using a technique such as but not limited to SSSS, decoding Chunk IDs requires using two or more of the metadata shares. This means that at least one metadata share should be obtained from a remote metadata server(s), which takes a longer time than simple metadata lookup operations. However, the time for downloading metadata shares from remote storages is significantly shorter than downloading file content. In addition, unlike metadata operation, file content operations are not requested as frequently as metadata operations. Thus, the extra delay of metadata downloading from remote servers is not a material factor of file read operations in terms of download completion time.

Asynchronous Content Forwarding to Remote Storages.

The present solution improves the user experience by staging encoded content in the user device before sending it to remote storages. Thus, the present solution returns the result to the user early and absorbs the delay by sending data to backend storages asynchronously. For example, when the present file system interface receives the request of a file content operation such as to write a file, the operation returns the result to a user interface after storing encoded content in a local buffer as staged status. The staged status is batch scheduled to complete in the background asynchronously. This design improves user experience significantly when writing a file because it decouples the latency between user device and remote storages from user-facing interactions.

Pre-Fetching and Caching File Content from Remote Storages.

Because of the large gap in latency between remote storages and local storage, pre-fetching and caching improves completion time of read operation and user experience. Unlike file write operations, file read operations are typically on-demand operations that require data content to be delivered immediately after a user wants to read a file. To reduce the delay to download required data pieces from remote storages, the present solution pre-fetches the required data pieces based on a user's file access pattern whose model is calculated by an AI module of the present invention. The module leverages temporal autocorrelation, user ID, type of application, capacity of cache storage, etc., to determine lifetime and replacement of cached data, pre-fetching data, etc.

Previous solutions were directed to distributed storage systems using multiple backend storages and providing an integration layer by using Erasure Code or SSSS (or their variations). While some introduced diverse backend storages in WAN and LAN, improving manageability and efficiency remained unsolved issues. The present solution addresses these and other issues in distributed storage systems deployed in WAN and LAN to improve their configurability and performance (i.e., latency). To overcome the complexity of diverse backend storage configuration in terms of cost, performance, and security, the present invention employs AI modules including an Event log collector (interface), a Data analyzer (algorithm generation), an Algorithm trainer (parameter tuner), a Model deployer (batch process), and an Executor (processor). (see FIGS. 1 and 2).

The present solution also addresses emerging challenges in distributed storage solutions, i.e., long latency of metadata operation and file content operations when the backend storages and metadata servers are deployed in long latency networks (e.g., Internet). The present solution improves the user experience by reducing latency of metadata operations, which are called more frequently than content operations, by allowing storing/retrieving a part of the metadata at a time, which is replicated in local storage. In the meantime, the present solution encrypts content-related metadata (e.g., Chunk ID) using SSSS (or equivalent) to keep metadata secure in a distributed manner. Asynchronous file content forwarding to remote storages when writing files decouples data store procedures from user-facing procedures, improving response to user interface early before completing content uploading tasks to the remote storages. AI-assisted pre-fetching and caching when reading files provides better prediction to place required data content in the local device based on user's file access pattern, type of application, etc.

The present solution also encrypts content in addition to encoding content directly using RS Coding (or equivalent), and RS Coding is used for encoding encrypted chunks, because such coding is at least useful for formulating efficient storage. Therefore, instead of using another algorithm such as SSSS which provides stronger encryption but more overhead, the present solution encrypts chunk contents using AES-256 (or equivalent) and stores its encryption key into metadata separately.

RS Coding is efficient in terms of storage and computing overhead as compared with other approaches such as SSSS. Because the present solution already overcomes the security weakness of RS Code by encrypting content before the encoding, other similar algorithms which focus on the efficiency and performance can be used.

SSSS (or equivalent) is used for encrypting metadata. The metadata is the root key of the content encryption. Even though the present invention can use other algorithms if they provide the same (t, n) or similar threshold properties, the present invention uses and requires a strong encryption algorithm to protect metadata, which is encrypted and stored differently and separately from content data. SSSS guarantees its safety theoretically, so a brute-force attack is not possible if an attacker does not have enough shards. Since the overall size of metadata is much smaller than file content, encryption overhead is ignorable.

For content encryption, SSSS shows n times storage overhead but RS shows n/t times storage overhead only. However, RS was not designed for cryptography, so it has limited randomness in the algorithm (it is static and comparatively easy to reverse). By also using AES-256 (or other encryption) for content chunks on top of RS code, the solution improves randomness while still achieving n/t times storage overhead. To protect the encryption key of the AES-256 (or equivalent) encryption, the second chain encrypts the key using SSSS and stores the key shards in metadata shards.

File content is chunked for several reasons. First, chunking provides the ability to identify duplicated content so we can improve storage efficiency by storing only one copy of the content with its references. Second, chunking improves security. An attacker would need to know the references of required chunks to obtain file content. Third, it improves flexibility of a data store and its location.

The system of the present invention is further directed to implementing end-to-end security regardless of the storage architecture and environment. File encryption/decryption operations are integrated to metadata and data read/write operations, which minimizes vulnerability of man-in-the-middle attacks and performance degradations. The system architecture of the present invention also enhances end-to-end security by separating the control path from the data path.

Figure 3:
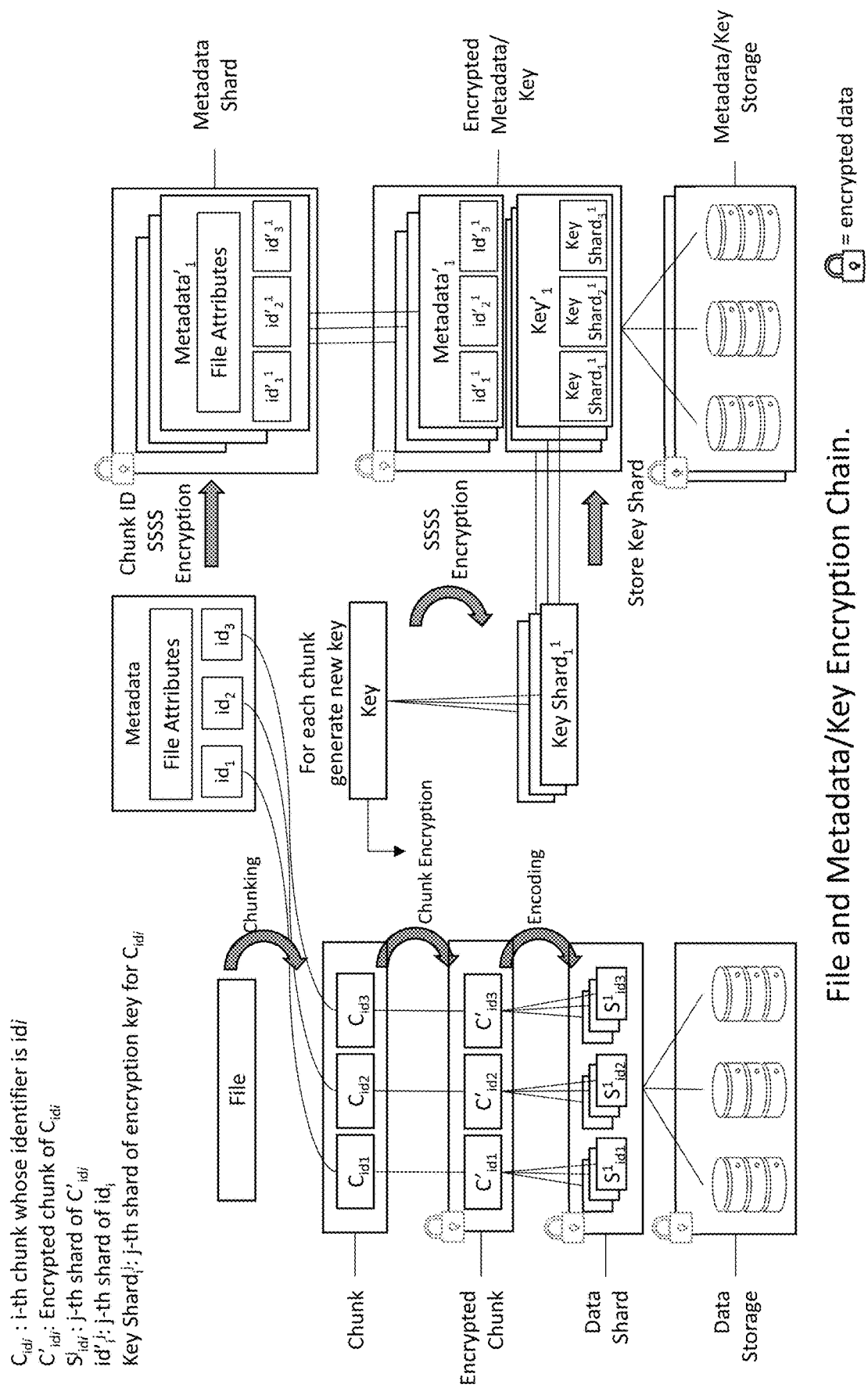
FIG. 3 shows the file and metadata/key encryption chains of the present invention.

See FIG. 3. The file encoding algorithm of the present invention, called the encryption chain, aims at integrating data/metadata encryption with data store strategy. This is the combination of Information-Theoretic Cryptography, which cannot be broken even if the adversary had unlimited computing power, and Computational Cryptography, which cannot be broken with the current computing technology within a period short enough to be practical.

Note that unlike prior solutions, in the architecture of the present invention, there is no single point where the data is aggregated between client[2] and data/metadata/key storages, which eliminates the vulnerability to a "man-in-the-middle" attack. Encryption chains are initiated on the user device without a proxy server. The encryption chain is also integrated into metadata and file I/O operations seamlessly to minimize modification of existing systems as well as to reduce change of user experience. The encryption chain does not require modifications of metadata and file operations, except for collecting data from storage nodes.

[2] While we occasionally use the word "client" when we refer to, for example, a proxy server, the term "user device", which could be a stand-alone server or computer or some other computing device, is assumed here to include various types of clients.

The encryption chain of the present invention consists of two parts: a file encryption chain and a metadata/key encryption chain. A file encryption chain includes chunks of a content file. The method of the present invention encrypts each chunk and then shards the encrypted chunks. Each chunk is a slice of the content file which ordinarily can be used to identify duplicated pieces[3]. In the present method, only one copy among the duplicate pieces is stored so as to save storage space (This technique is called Data Deduplication) with location noted in the metadata. Each chunk is encoded as multiple shards using RS coding. Because RS code is not generally used for cryptography, chunks are encrypted with at least one encryption key, where the key

Figure 10:
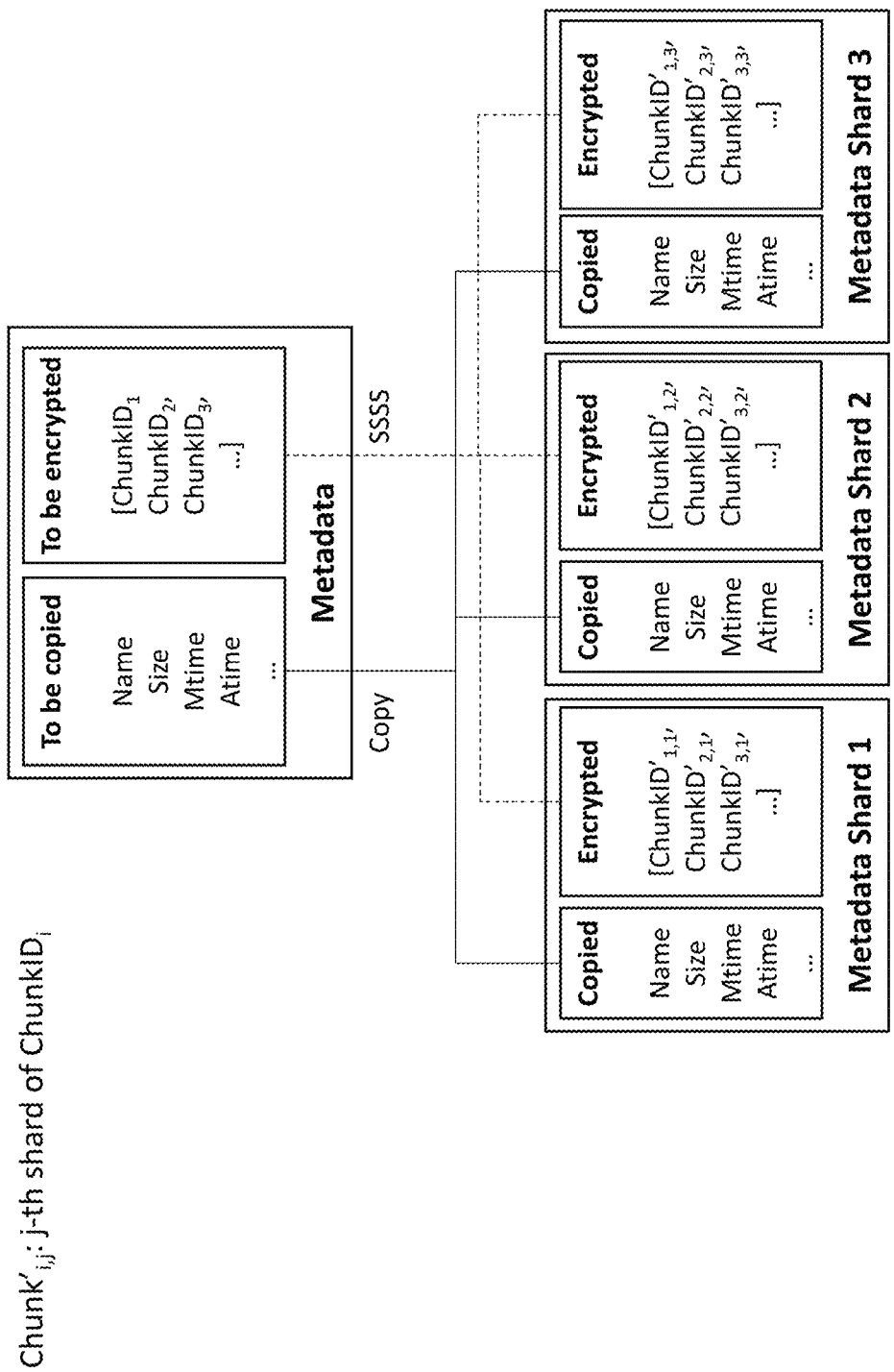
FIG. 10 shows metadata encoding of "replicated" data and the "encrypted" data of the present invention.

[3] KyoungSoo Park, Sunghwan Ihm, Mic Bowman, and Vivek S. Pai, "Supporting practical content-addressable caching with CZIP compression" Proceedings of the 2007 USENIX Annual Technical Conference, Santa Clara, Calif., USA, Jun. 17-22, 2007. which is randomly generated for one-time use before the chunk is encoded as shards. The encryption key is stored securely within a metadata/key encryption chain. The keys and chunk identifiers (chunk IDs) are encrypted by SSSS. Each set of chunk ID shards and each set of the encryption key shards are distributed to metadata storage nodes and key storage nodes in the form of metadata and key shard files respectively. This process does not require a centralized component to calculate the allocation of metadata, key, and data shards among multiple storage nodes. The following sections explain details of file and metadata/key encryption chains, referring to FIG. 4. FIG. 10 provides a further example.

File Encryption Chain.

A file and its metadata are inputs of the proposed encryption chain algorithm. The algorithm generates data shards (an encrypted file) and encrypted metadata. Before diving into the procedure of the file encryption chain, we define plain metadata M=(I,A) where I is an ordered list of chunk IDs and A is a set of file attributes.

Chunking splits a file f into smaller pieces (called chunks) such that $C=\{c_{id}|id \in I \text{ of } M\}=\text{Chunking}(f)$ where $c_{id}$ is the content of a chunk (step 3). Chunking improves transmission efficiency and increases the effectiveness of data deduplication. Chunking also solves the issue of maximum size of a file that may be specified by the storage backend. The content of chunks is encrypted with an encryption key k which is randomly generated whenever updated content and metadata are stored. An ith encrypted chunk is represented as $c'_{id}=\text{Encrypt}(c_{id},k)$. An encryption algorithm can be one of legacy encryption algorithms such as AES-256, etc. The encryption algorithm is not limited to a specific algorithm. The encrypted chunks are encoded into multiple data shards using RS Coding. Because RS Code is not designed for data encryption but for error correction, applying RS coding after encrypting chunks complements a security weaknesses of RS Code. We represent the data shard (or shard) such that $S_{id}=\{s_{id}^i|1\leq i \leq n\}=\text{RS}(c_{id}, t, n)$, where t and n are the parameters of RS Code. The data shard is the unit of data store in this system, which is encrypted with legacy encryption algorithm for and encoded by RS Coding for data resilience. Finally, the data shards are stored to multiple storages.

Metadata/Key Encryption Chain.

Metadata is preferably stored across multiple storages. When storing metadata, the references of required chunks (Chunk IDs) are securely encrypted preferably with SSSS, which ensures theoretical security of the metadata/key encryption chain. The encrypted Chunk IDs are represented by $\{id'_i|1\leq i \leq n\}=\text{SS}(id, t, n)$ where t and n are parameters of SSSS. The rest of the metadata information, such as file attributes, is not encrypted to improve metadata lookup performance. Like Chunk IDs, the encryption key k is encrypted by SSSS such that $\{k'_i|1\leq i \leq n\}=\text{SS}(k, t, n)$ where t and n are parameters of SSSS. Then, each id; is stored to encrypted metadata $M'_i=(I'_i,A)$. Finally, each $M'_i$ and $k'_i$ is going to be stored to metadata storage and key storage respectively.

Therefore, as an overall encryption solution of the content and metadata, the proposed encryption chain is a function of $(C,I) \rightarrow (C'_1,I'_1), \ldots, (C'_n,I'_n)$. Since content and references are stored after computational and theoretical cryptographic techniques are applied, respectively, the data, in each data shard and the encrypted metadata/key, does not contain meaningful information for reconstruction.

Decrypting Chains.

Data Decoding is the reverse procedure of the encryption chain. By collecting encrypted metadata/key from different metadata/key storages, which is a required procedure for the regular file operation, required key shards are collected to decode encryption key and chunk IDs. Then, required data shards are collected to regenerate encrypted chunks. Finally, the original file is reconstructed after decrypting chunks and concatenating them in order.

Figure 4:
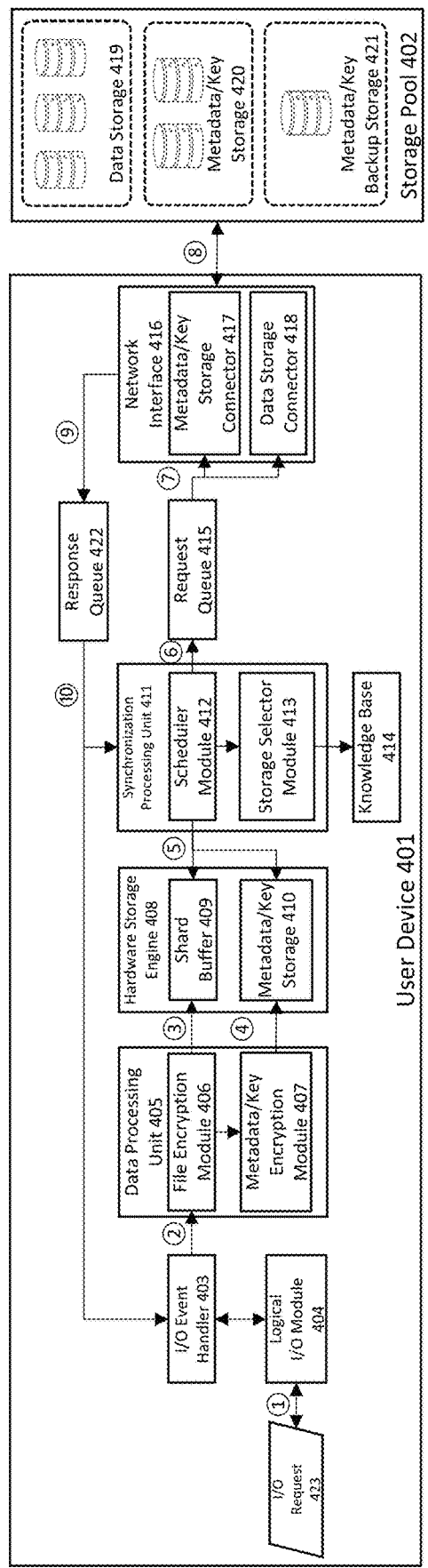
FIG. 4 shows the system components, interactions, and process steps.

FIG. 4 shows an example of the system architecture, including the system components, interactions, and process steps. A user device encrypts (and decrypts) content and metadata and synchronizes data between the user device and storages. The Logical I/O module is an interface communicating with users. If the Logical I/O module receives a file I/O request such as Open, Read, Write, etc., an event handler handles the request by hijacking its native file operation event to perform add-on encryption chains for the file processing. To ensure end-to-end security, the present invention preferably implements Flush, Fsync, and Close Handlers as the place performing file encryption before storing data content to the storage.

There are several usable approaches, including but not limited to algorithms, such as round-robin, random, and min-max algorithms. In one embodiment of the present invention, a min-max algorithm minimizes the maximum transmission time at each storage using empirical data transmission speed to deliver to storages. When uploading, a min-max algorithm, as implemented here, stores more shards in faster storage if more storages are available than the encoding parameter n, the number of shards to store for each chunk. When downloading, the present min-max algorithm is more useful by selecting a fast t, the number of required shards to reconstruct chunk, storages from n storages where the corresponding shards are stored. That is, when reconstructing a file which is distributed into n shards, t chunks are needed.

As a linked chain of the file encryption chain, the metadata/key encryption chain generates multiple metadata and key shards, which contain encrypted information such as one or more encrypted Chunk IDs in the metadata shards and encrypted keys by SSSS. One of the encrypted metadata files is stored at the Metadata Storage in the User Device. Specifically, we store a copy of the metadata shard files in a local device to reduce latency of metadata operations. Other metadata and key shard files are stored to metadata/key storages that can be configured at either single storage node or logically/physically independent storage nodes according to user's preference.

The synchronization processing unit 411 calculates timing of data transmission between the User Device and Storages based on its knowledge base. The synchronization processing unit also selects/identifies location of shards and encrypted metadata files using its knowledge base. This task aims at cost optimization, performance optimization, security optimization, etc.

Data transmission requests are pushed to the request queue, and the connectors fetch corresponding requests to perform actual data storage over the network. Response messages from the storages are pushed to the response queue which serializes asynchronous responses of data store requests. The responses are fetched to update shards and encrypted metadata storing status. If an I/O request requires data transmission synchronization, the I/O event handler waits until the corresponding responses are collected.

The system provides end-to-end security of the stored data by integrating an encryption chain and applying information dispersion theory. End-to-end data security is a challenging topic because: (1) a delay between an end-user device to a storage backend location is much higher than that of between machines in the data center; (2) the performance of the system is limited by the most limited component; and (3) the control of resources and the environment setup is limited. High network latency between clients and metadata servers impacts the performance of metadata operations.

Because the metadata includes critical information needed to assemble file content, storing it in its entirety on an end-user device can be highly risky. If metadata is stored to a delegate server (or servers), metadata lookup operations, which are more frequently called than data lookup operations, become a bottleneck in the system performance. Ceph's methodology, as an example, includes storing metadata to distributed servers, which are logically different from content storage, while balancing overheads among metadata servers. A challenge in the end-to-end solutions is that the delay among clients and servers is not sufficiently predictable to design a system guaranteeing (near-) optimal or approximated performance. The decomposition of the functions, such as encoding/decoding, identifying duplicated content (mostly called as data deduplication), and designing data/control channel determines functions and performance of the system should be designed carefully considering computing capacity of hardware, expected latency of networks, and frequency of operations.

With regard to the "t out of n" approach in the present invention, such an approach is significant in multiple ways at multiple times. To start, there are numerous times in the present invention when an item is parsed into n units. In each case, however, n can be a different value. Similarly, each different t can be a different value as well (although two or more such t's and/or two or more such n's can be the same value as well). The present t out of n approach is preferably directed to the number of parsed data content pieces, separately to the number of parsed metadata pieces, and separately to the number of pieces of data shard pieces of each encrypted chunk of content data.

When it comes to reconstruction, the t out of n approach becomes significant multiple times.

Formulating a file encryption chain and a metadata/key encryption chain are computational tasks typically being performed at a data processing unit. As previously explained, a file encryption chain encodes/decodes data shards, which is followed by a metadata/key encryption chain serving a similar function. The data shards are temporally stored at a shard buffer until the shards are scheduled to be synchronized to data storages.

Again, FIG. 4 illustrates a system overview. This client-centric architecture, one example of possible deployment schemes, shows components deployed to an end-user device that creates file and metadata/key encryption chains as well as spreads encrypted data into storage backends. A client is not limited to an end-user device such as a PC, laptop, or handheld device, but also may be, as an example, an enterprise server.

FIG. 4 depicts the relationship between a user device 401 and storage pool(s) 402 in the context of the present invention. User device 401 may be a processor or a group of processors programmed to perform at least the functions shown. As shown, user device 401 is responsible for the encryption and chaining, and decrypting as well. User device 401 comprises input/output means including I/O request engine 423 (in process step 1), input/output event handler(s) 403 for delivering file content (2) including but not limited to at least one input/output logical module 404, at least one data processing engine/unit 405 including a file encryption module 406 performing functions including (3) file shredding, encoding, decoding, encrypting, and decrypting chunks and data shards, a metadata/key encryption module 407 including functions (4) including metadata file and key shredding, encoding, decoding, encrypting, and decrypting shards, a storage engine 408 and associated storage including a shard buffer 409 and metadata/key storage 410 for (5) identifying data shards and metadata/key shards for upload and download, a synchronization processing unit or engine 411 including a scheduler 412 and a storage selector 413, collectively requesting queueing (6), a request queuing engine 415 for allocating requests (7), a network interface engine 416 including connectors for data 418 and metadata/key storage 417 for delivering data requests over a network (8) and a response queuing engine 422 for transmitting data results (9) and updating shards and encrypted metadata/key status (10). User device 401 communicates with various remote external storage pools 402, which may be distributed, and which include data 419 and metadata/key 420 storage as well as backup storage(s) 421.

The reconstruction process is the reverse procedure of the chunking, encrypting, sharding, and distributing process, which can be implemented as, but not limited to, a user application with Graphical User Interface (GUI) and/or using a general file system interface (e.g. POSIX). In the present invention, the GUI or file system interface lists files preferably by file name and modification time. We also support other more general file system interfaces (file modification time is preferably stored as a file attribute in metadata). Those interfaces require mandatory file attributes such as file name, modification time, access time, size, and so on. Thus, all files being shown in the interface have the attributes so that each of a user and system interface can identify a file.

In reconstructing a file, it is necessary to reconstruct the metadata first. t portions of the metadata need to be identified so as to reconstruct the metadata. The metadata includes chunk data of the content data, by chunk, so t shards need to be identified for each chunk so as to reconstruct each chunk (again, each t and each n by chunk may but need not differ from one another and from the t out of n for metadata). Each chunk is reconstructed using at least its associated key, previously stored and encrypted in metadata. After each chunk is reconstructed, the chunks are arranged as they had been initially so as to reconstruct the entire file and make it usable once again.

As noted before, there are numerous storage facilities usable in the present invention and, in a preferred embodiment, the more necessary items for reconstruction are stored in the more accessible (and potentially more costly) areas. Further, such items can be moved from one location to another based on, as mentioned examples, cost considerations. As a result, there may be an implemented algorithm for on-going storage relocation of parsed data content and metadata elements. Nevertheless, the reconstruction process, including multiple t out of n approaches, remains the preferred embodiment.

File Reconstruction Example.

We assume there is an encrypted file F whose content consists of one chunk $C_1$ and is encrypted as $C'_1$ and stored as shards $S_{1,1}$, $S_{1,2}$ ... $S_{1,n}$. The metadata M for file F has been amended to include stored $I_1$ as chunk ID of $C_1$, encryption key $K_1$ and file attributes including name, size and modification time (mtime), which are metadata shards $M_1$, ... $M_3$. Metadata shard $M_i$ as stored includes file attributes (name, size and mtime), encrypted chunk ID $I'_{1,i}$ and encryption key $K'_{1,i}$.

When a user attempts to reconstruct a file, the user interface displays stored files by accessing a set of metadata shards in the user device. The display typically shows file name and time of encryption. The user can start reconstruction of the file F by selecting the file by name. The system identifies corresponding metadata shards in the metadata backend storages by finding the same file attributes. The system decrypts $I_1$ from $I'_{1,i}$ and $I'_{1,j}$ and $K_1$ from $K'_{1,i}$ and $K'_{1,j}$ in two corresponding metadata shards $M_i$ and $M_j$. Using $I_1$, the system downloads t shards from the corresponding shards $S_{1,1}$, $S_{1,2}$ ... $S_{1,n}$ to reconstruct encrypted chunk $C'_1$ that is going to be decrypted into $C_1$ using $K_1$. Finally, the file F is reconstructed by the reconstructed chunk(s).

The pair of file name and modification time is the initial combination needed to reconstruct a file. With reference to FIG. 4, to ensure end-to-end security, the reconstruction is integrated with the file open operation, which specifies file name and modification time. Metadata/Key encryption module 407 requests collecting metadata and key shards to synchronization processing unit. 411. Storage Selector Module 413 selects t target metadata/key storages based on the optimization parameters including, but not limited to, latency and cost. If no preferable parameter is configured, the storages are randomly selected. Metadata/Key encryption module 407 decrypts chunk IDs and encryption keys to the corresponding chunks. File encryption module 406 requests collecting data shards specified by the chunk IDs. Storage selection for the data shards is the same as with encryption. File encryption module 406 reconstructs encrypted chunks using the data shards. Then the encrypted chunks are decrypted to plain chunks of the file using the encryption keys.

The Control Server oversees clients in order to control and monitor their status. The Control Server also configures the data storage, the metadata/key storage, and the metadata/key backup storage, but the Control Server does not serve a proxy of the storage backends. The Control Server also provides an administrator portal to control overall configuration such as data storage setup, metadata storage setup, key storage setup, status monitoring, policy configuration, access control, etc. The Control Server is also responsible for initial authentication of a user and a device. The Control Server may integrate an authentication procedure with existing components such as LDAP or similar.

The data storage is the location where user data is actually stored. There is no code execution on the data storage. Thus, the data storage is not limited to cloud services but may include any of legacy storage nodes with a network. The metadata storage and key storages are the location where file metadata and encryption keys are stored. The data storage, metadata storage, and key storage can be configured with independent (t, n) parameters. Metadata and key storages have similar requirements to that of the data storage, so a data storage node may alternatively be used for metadata and key storages. Storages can be configured depending on performance and reliability requirements as well as data management policy. The metadata/key backup storage stores duplicate copies of metadata/key shards that are the same as metadata/key shards on a client device. Since the metadata and key shards are encrypted by SSSS, replicating the same set of shards does not increase the risk of data breach. Even though those data storage, metadata/key storage, and metadata/key backup storage may be deployed via LAN, over Internet, or hybrid, there are guidelines for optimal deployment: A Control Server may be in either in a cloud or LAN; Metadata/Key backup storage in the LAN; or data storage and metadata/key storage in a cloud or hybrid between a cloud and LAN.

Data Path and Control Path Separation.

Figure 5:
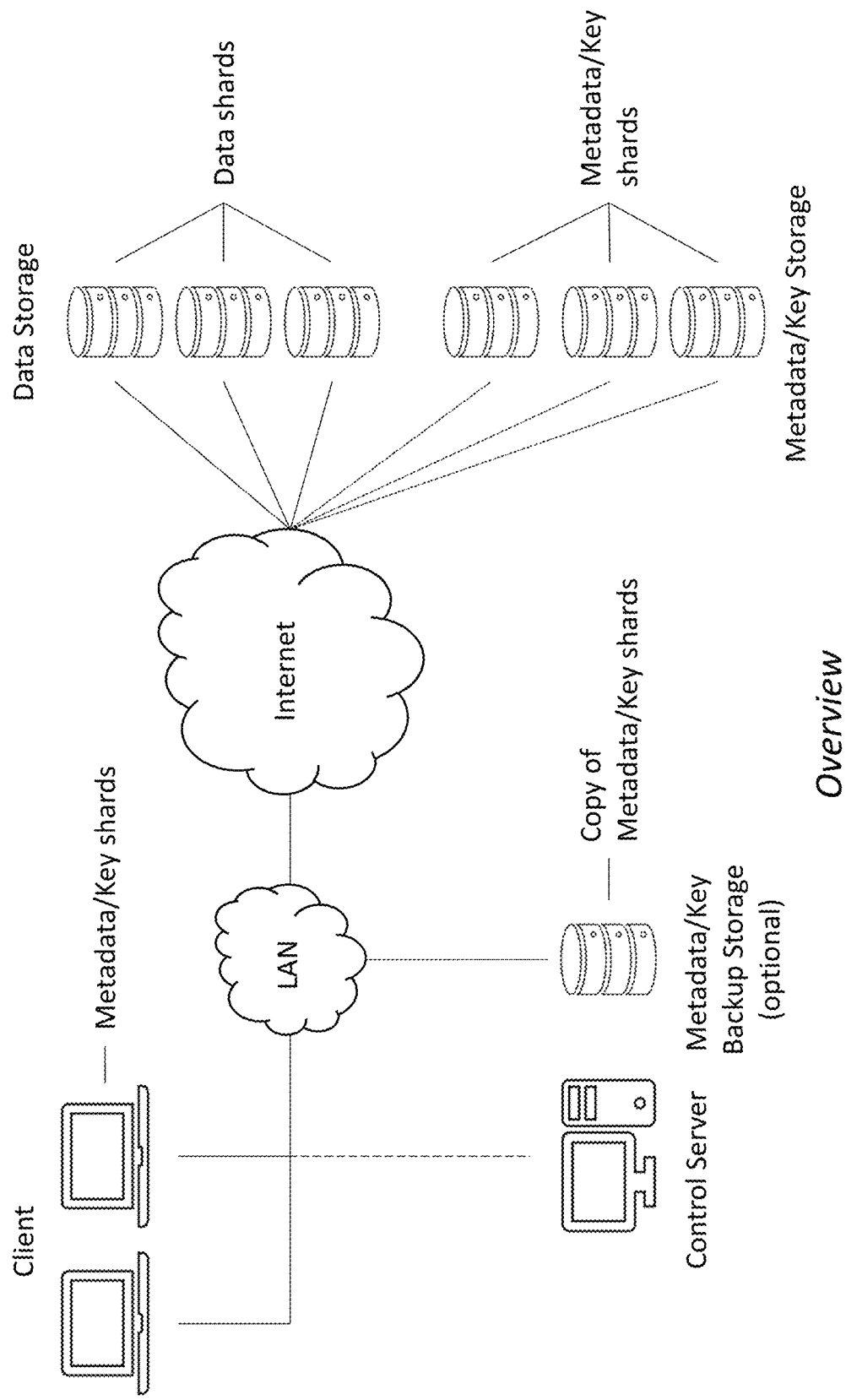
FIG. 5 shows how data path control paths are separated in the present invention.

FIG. 5 shows an overview of how data and control paths are separated in the present system. In addition to decoupling metadata, a control path (long dashed lines) between a Control Server and a client is logically or physically separated from a data path between a client to data storage (solid lines).

The separation of a data path and a control path prevents even a highest privileged administrator of the Control Server from accessing user data. Each data path between a Client and each Data Storage is protected independently by leveraging diversity of security mechanisms offered by each data storage node. Due to the independency of the control path from a data path, deploying a Control Server is a flexible process without impacting security and performance configuration.

Storing Data Shards.

To ensure end-to-end security, I/O Event Handler intercepts Flush* and Fsync* file system call events to implement file encryption before storing data content to the storage nodes. The data shards from encrypted chunks are buffered in Shard Buffer until transmission to Data Storage is scheduled. Thus, the present invention guarantees an intermediate data encryption after Flush is called. The scheduler determines the location of data shards and timing of the transmission based on the configuration such as cost optimal, performance optimal, and security optimal. For example, the consistent-hash algorithm minimizes shard relocation costs when attaching/detaching a Data Storage. Further advanced algorithms may be developed and deployed.

* Flush and Fsync are filesystem calls that synchronize data in main memory to physical storage device. Fsync is a low-level system call of Flush. www.man7.org/linux/man-pages/man2/fdatasync.2.html Storing Encrypted Metadata/Key.

A metadata/key encryption chain is triggered after completing a file encryption chain. The encryption keys are sharded in the local metadata/key storage until transmission to key storage is scheduled. Unlike storing data and key shards to data and key storage nodes, storing metadata is a synchronized process with Flush, Fsync or Close calls. Thus, if storing encrypted metadata fails, Flush, Fsync or Close would return a failure code.

Staging Data.

Staging data in an end-user device before uploading shards to storage backends improves user experiences by absorbing upload delays as well as giving users more freedom to schedule data store. In the storage of the present invention, there are 6 states of staged data. Note that State 4 must be synchronized with State 3 because metadata must be stored to continue the process.

State 0: Ready to start
State 1: Encrypt chunk content with randomly generated encryption key; encode data shards (block 1 in process)
State 2: Encrypt chunk ID (block 2 complete)
State 3: Store metadata and key shards (block 3 complete)
State 4: Store data shards (Revisit block 1 and complete)
State 5: Done Metadata Operations.

Since shards of encrypted metadata are stored in multiple locations, metadata lookup operations are able to read file attributes directly from local encrypted metadata shards. Directory operations and file attribute operations do not cause performance degradation regardless of the latency of metadata/key storage and data storage. Because writing a metadata file is mostly related to data operations, a delay of writing metadata is small enough to ignore comparing with other data storage and recovery operations.

Metadata Storage Selection.

Unlike when spreading data shards, metadata shards are stored to pre-configured metadata storages. The guideline of metadata encoding is to set $(t, n)=(2, 3)$. Defining metadata: $M=\{M'_1, M'_2, M'_3\}$ where $M'_i$ is encrypted metadata shard, $M'_1$ At least some metadata is always stored to the metadata vault in a local device, which reduces latency of the metadata lookup operation. The rest of the metadata shards $M'_2$ and $M'_3$ are stored to remote metadata storages. The system of the present invention is configured to distribute the metadata shards into multiple metadata storage nodes. As an optional process, a copy of metadata shard $M'_1$ is stored to a metadata backup storage. Storing a copy of $M'_1$ does not change the parameter n while increasing the resiliency of metadata shards. Even though the guideline suggests $(t, n)=(2, 3)$ configuration, the system of the present invention may be flexible and configurable depending on the customer requirements.

Synchronize Metadata and Data Content.

Metadata and data content of all files are synchronized periodically. This process calculates reference counters of chunks according to their states, i.e., local only, remote only, local and remote, intermediate state. The reference counters are used to schedule chunk encoding and spreading shards. This process also identifies un-referred chunks that can be deleted completely.

Data Deletion.

Since metadata updates are stored to track history, deletion does not delete metadata or content data. When a file is updated, the system stores the updated metadata without deleting the previous version until the number of previous versions exceeds pre-defined number. If a metadata file should be deleted, the system finally unlinks the reference between the metadata and a chunk. If the system identifies chunks whose reference count is zero, the system finally deletes the chunks from backend storages.

Figure 6:
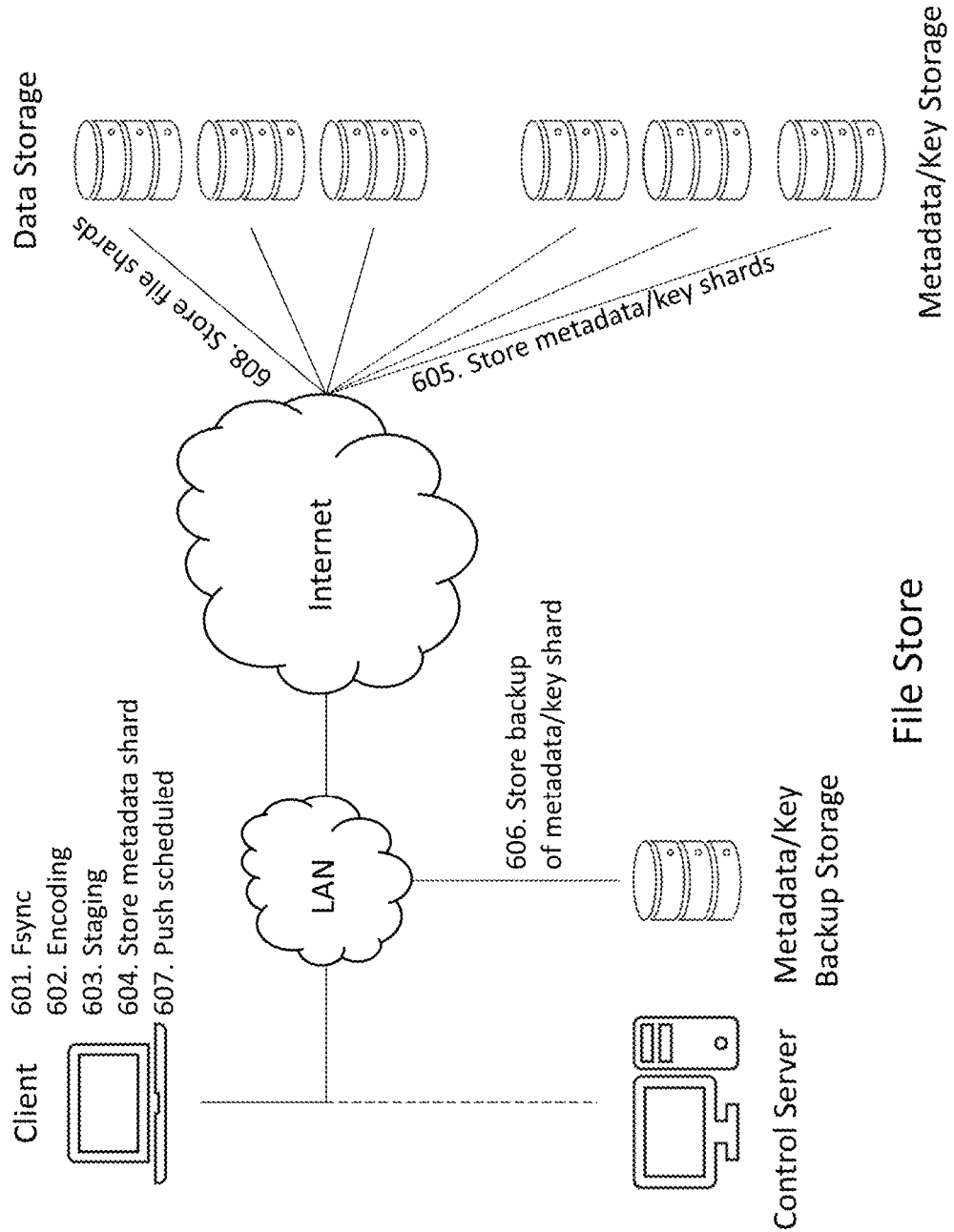
FIG. 6 shows a step-by-step procedure of File Store of the present invention.

Normal Mode Operations. FIG. 6 shows a step-by-step procedure of the File Store process of the present invention. As shown, there are 8 relevant steps:

601. Fsync—performed at Client
602. Encoding—performed at Client
603. Staging—performed at Client
604. Store metadata shard—performed at Client
605. Store metadata/key shards—from Internet to metadata/key storage
606. Store backup of metadata/key shard—from LAN to metadata/key backup storage
607. Push scheduled—performed at Client
608. Store file shards—from Internet to data storage Whenever a specific system call event is received, such as Fsync and Flush, the client starts encoding the corresponding file into an encryption chain. When the file encryption chain process has completed, the data shards are staged (ready to push to Data Storages). Then, metadata shards are stored to the Client, metadata storage, and metadata backup storage. Key shards are also stored to key storage, and key backup storage. Finally, the staged data is scheduled to store data storages when the Scheduler triggers execution.

File Fetch is a reverse procedure of File Store. Even though there exists a certain level of storage failures (at least t from n storages are available where t is a parameter of RS code and SSSS code), File Fetch operations are executed as a normal mode (the failures are logged). If a number of errors exceeds a configurable threshold (less than t storages are available), File Fetch returns fetch error to the user.

Figure 7:
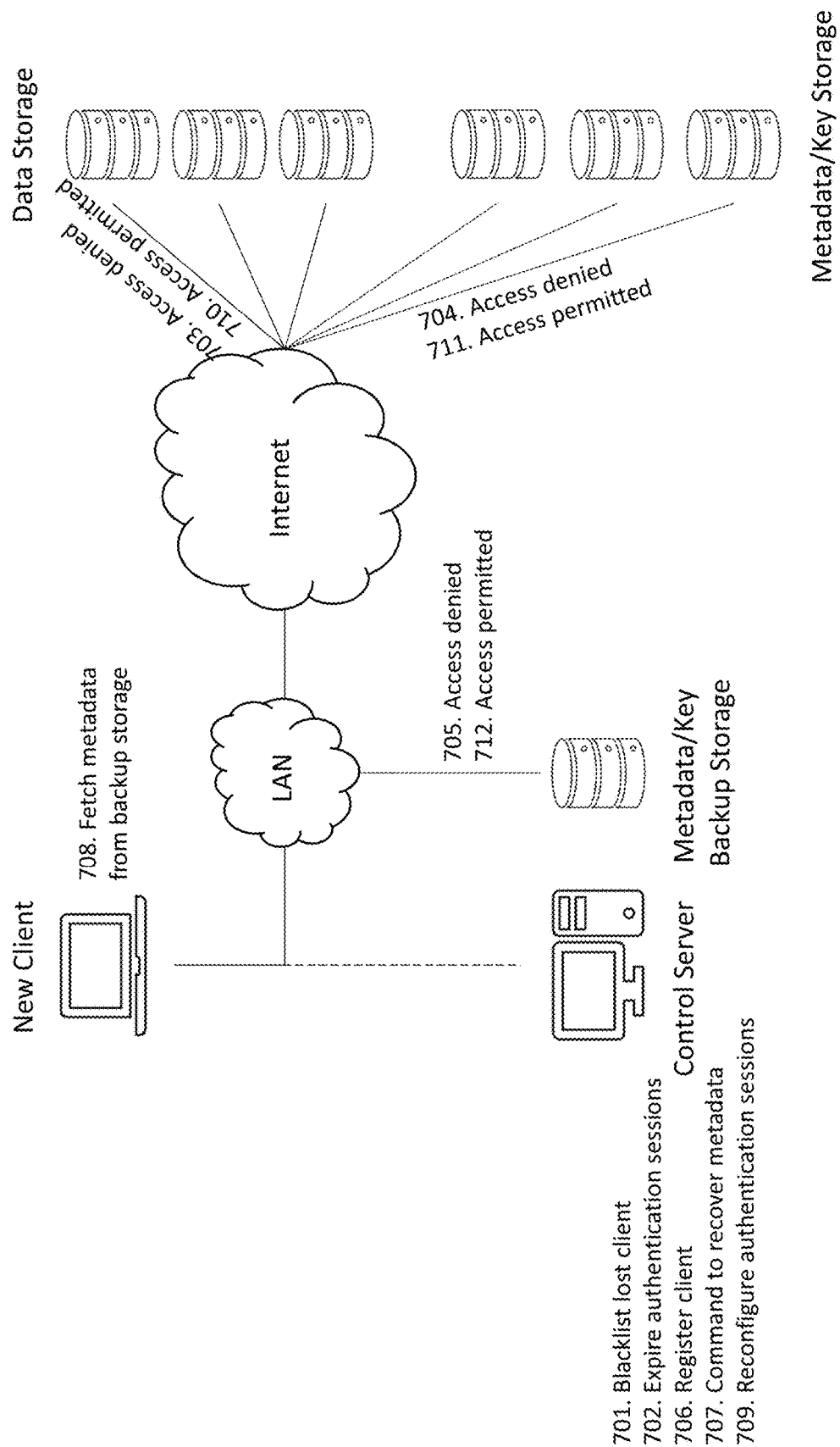
FIG. 7 shows blacklist lost client and configure new client.

At times, it may be important to blacklist a client, such as but not limited to a lost client. FIG. 7 shows the procedure of adding an old device to a blacklist and registering a new client. If a user loses a client, the user and/or administrator reports it to the Control Server. Steps in the procedure as shown include:

701. Blacklist lost client—performed by control server
702. Expire authentication sessions—performed by control server
703-5. Access denied
706. Register client—performed by control server
707. Command to recover metadata—performed by control server
708. Fetch metadata from backup storage—performed by new client
709. Reconfigure authentication sessions—performed by control server
710-12. Access permitted The Control Server places client information into the blacklist and expires all sessions that were used for authentication with data storages, metadata/key storages, and metadata/key backup storage. If a user recovers or replaces a client device, to recover files, the new client must be authorized by the Control Server. Then, the Control Server sends a command message to recover metadata using the metadata/key backup storage. Finally, the Control Server gives the new client access information to data storages, metadata/key storages, and metadata/key backup storages.

Failure Mode Operations.

Failure Mode Operations allow users to continue using the system if the number of storage failures does not exceed a threshold. Unlike File Fetch, which does not require a failure mode, File Store requires a mechanism to handle backend-side upload failure errors to keep the system under controlled and executable states.

Figure 8:
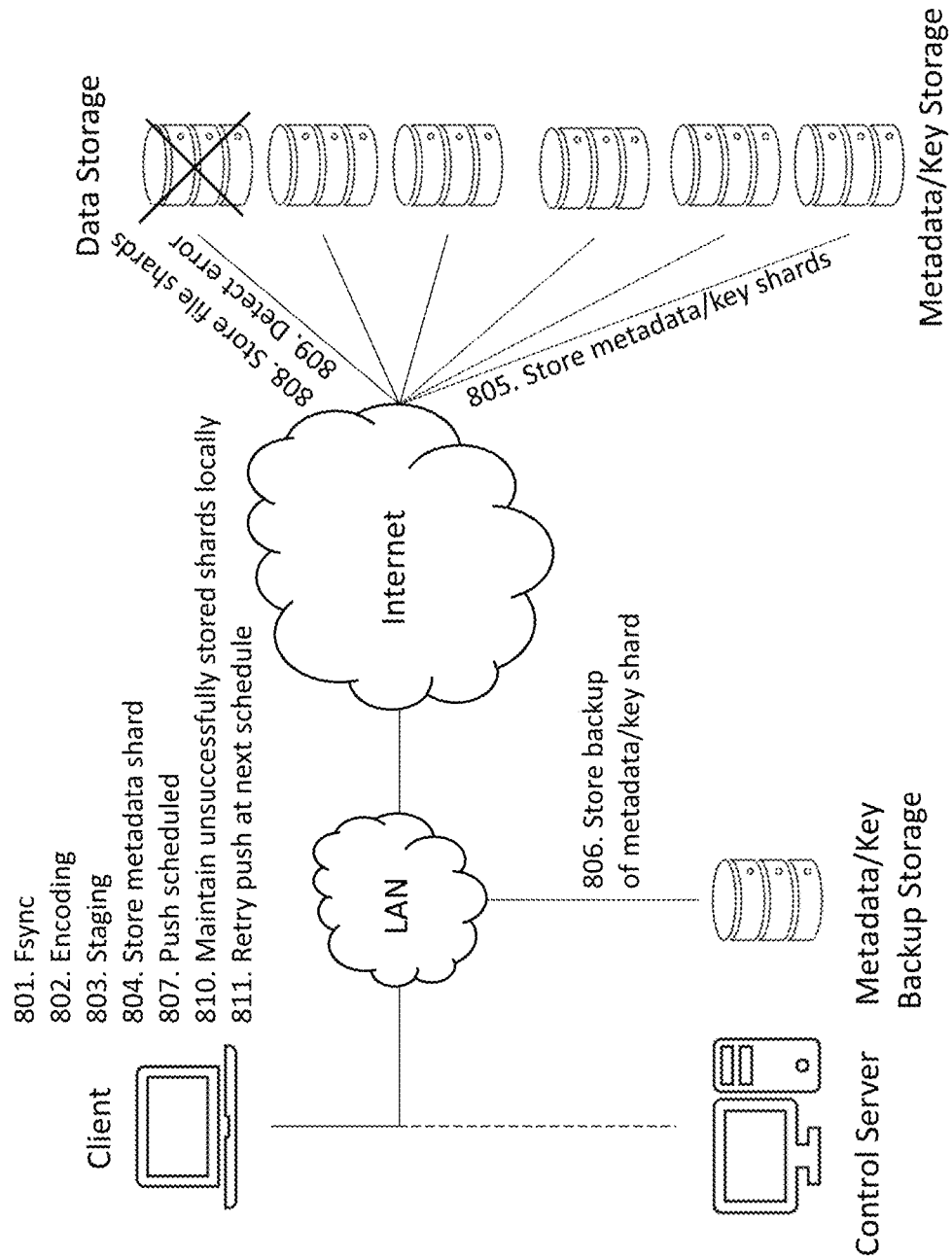
FIG. 8 shows a procedure of file store with data storage failure.

FIG. 8 shows a procedure of file store with data storage failure. The steps of this process include:

801. Fsync
802. Encoding
803. Staging
804. Store metadata shard
805. Store metadata/key shards
806. Store backup of metadata/key shard
807. Push scheduled
808. Store file shards
809. Detect error
810. Maintain unsuccessfully stored shards locally
811. Retry push at next schedule The procedure is the same as with the normal mode file store operation until data shards are pushed to data storages. If client detects upload errors to store shards, client keeps the shards locally, which are managed as in the same way as with staged shards. Then, the scheduler (within client) re-schedules the shards with other new staged shards in the next push cycle.

Figure 9:
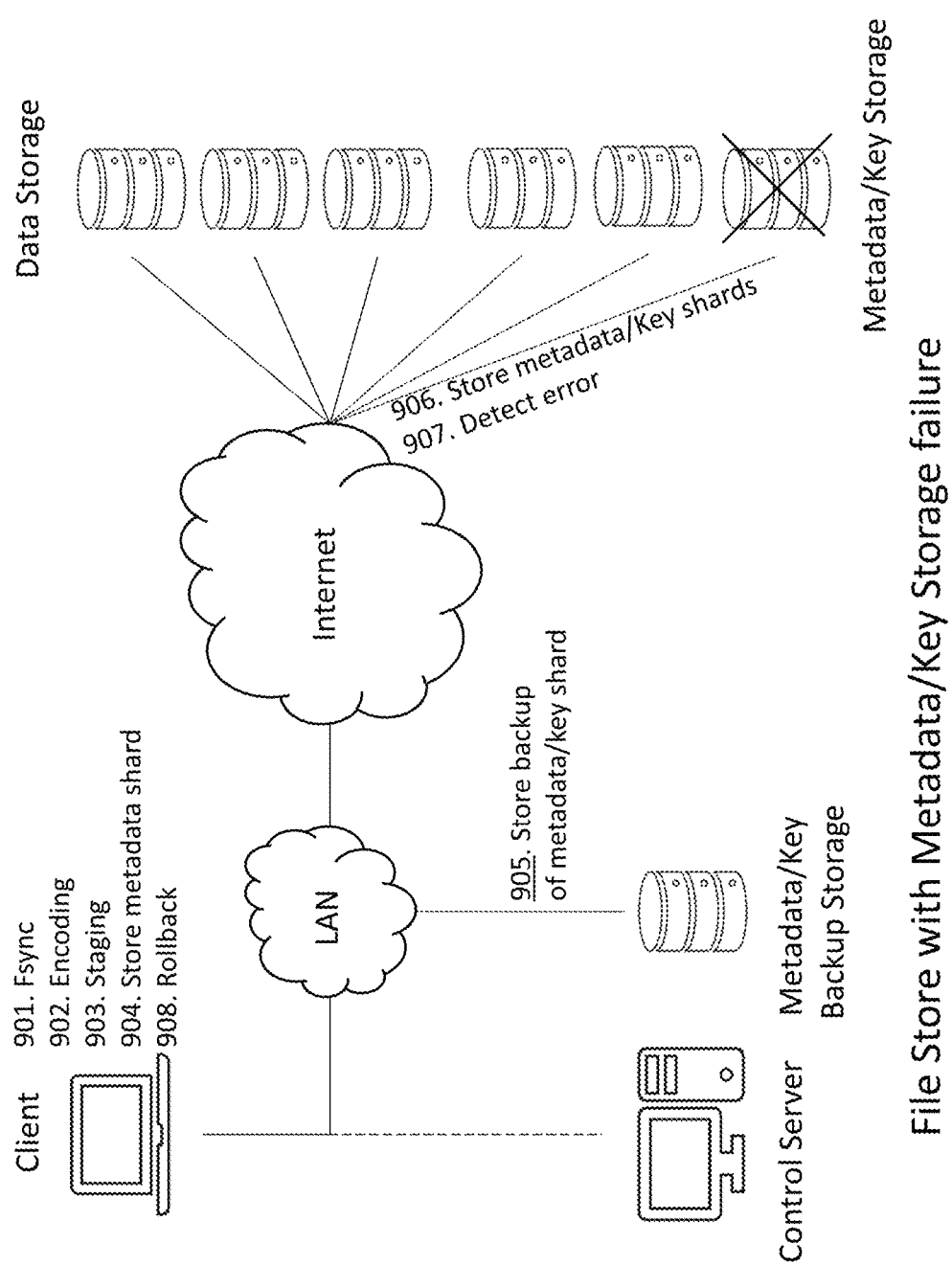
FIG. 9 shows a procedure of file store with metadata/key storage failure.

FIG. 9 shows the procedure of File Store with metadata/key storage failure, which is much more critical than data storage failure. The steps of this process include:

901. Fsync
902. Encoding
903. Staging
904. Store metadata shard
905. Store backup of metadata/key shard
906. Store metadata/key shards
907. Detect error
908. Rollback Unlike the failure mode of data storage failure, metadata/key storage failure does not allow the system to continue file store operation. Instead, the data store operations in progress are rolled back. All files previously stored are still accessible in a read-only mode until metadata/key storage is recovered.

FIG. 3 depicts an encryption chain creation embodiment of the present invention. A file encoding approach, herein called the encryption chain, aims at integrating the data/metadata/key encryption with the data/metadata/key storage strategy. Method steps include:

1. Creation of file encryption chains.
   Each data file is parsed into chunks to form an encryption chain.
   Encryption chains are preferably initiated on the user device, not a centralized device.
   Two separate encryption chains are created—a data file encryption chain and a typically later-created metadata file encryption chain. This metadata file includes but is not limited to information related to how the data file encryption chain is encrypted and other information related to the encryption and/or distribution of the metadata file encryption and distributed.
   In this embodiment, a data file is first chunked and then encrypted.
   When chunked, each chunk is assigned an ID and the assigned IDs are included in the metadata.
   Each encrypted chunk is then broken into shards.
   The shards are ultimately sent to storage, each shard potentially moving to a different storage medium, potentially in different locations.
   There preferably is no metadata encrypted within the data shards (but chunk identifiers are embedded in the metadata shards).
2. Data file encryption uses conventional file encryption plus subsequent Reed-Solomon (RS, or equivalent) coding for sharding.
   Each data file is parsed into an encryption chain, in which the file is spread into chunks and then each chunk into shards.
   Each chunk has a specified ID, which may be determined by calculation.
   The metadata is augmented by the assigned IDs, so that the metadata includes various file attributes (such as but not limited to name, size, modification time, and access time) and the IDs, where each ID relates to a specific data file chunk.
   The chunk IDs are inserted into the associated metadata.
   Data file chunks are encrypted and then encoded using RS or equivalent.
   The encrypted chunks are then sharded.
   Because RS code is not designed for cryptography, chunks are encrypted with an encryption key, determined by the processor of the present invention, which may be randomly generated for one-time use before a chunk is encoded as shards.
   One key might be used for the entire data file chunking, encryption, and storing process, a different key could be used for each chunk, or something in between can be used. The determination of quantity of keys may be performed by the processor of the present invention and the result stored in the metadata for chunking, etc.
3. For metadata, which stores the references of required content, we encrypt chunk identifier (chunk IDs) using SSSS, or equivalent.
   Metadata shard file stores the chunk ID shards.
   Each encryption key is itself sharded.
   We also encrypt each encryption key (for chunk encryption) using SSSS or equivalent.
   Other than SSSS encryption schemes can alternatively be used.
   User can specify the minimum number of shards needed to reconstruct the file.
4. A set of chunk ID shards are stored to the metadata shard file with replicated file attributes including size, modification time, etc. The encryption key shards are associated with corresponding chunk IDs.
5. The shards of chunked data, metadata, and encryption key are stored into physically or logically distributed storage/medium.
6. This process does not require a centralized component to calculate the allocation of data, metadata, and key shards among multiple storage units.
7. Various algorithms are applicable to improve storage efficiency and performance to select storages for storing/fetching shards.

Figure 11:
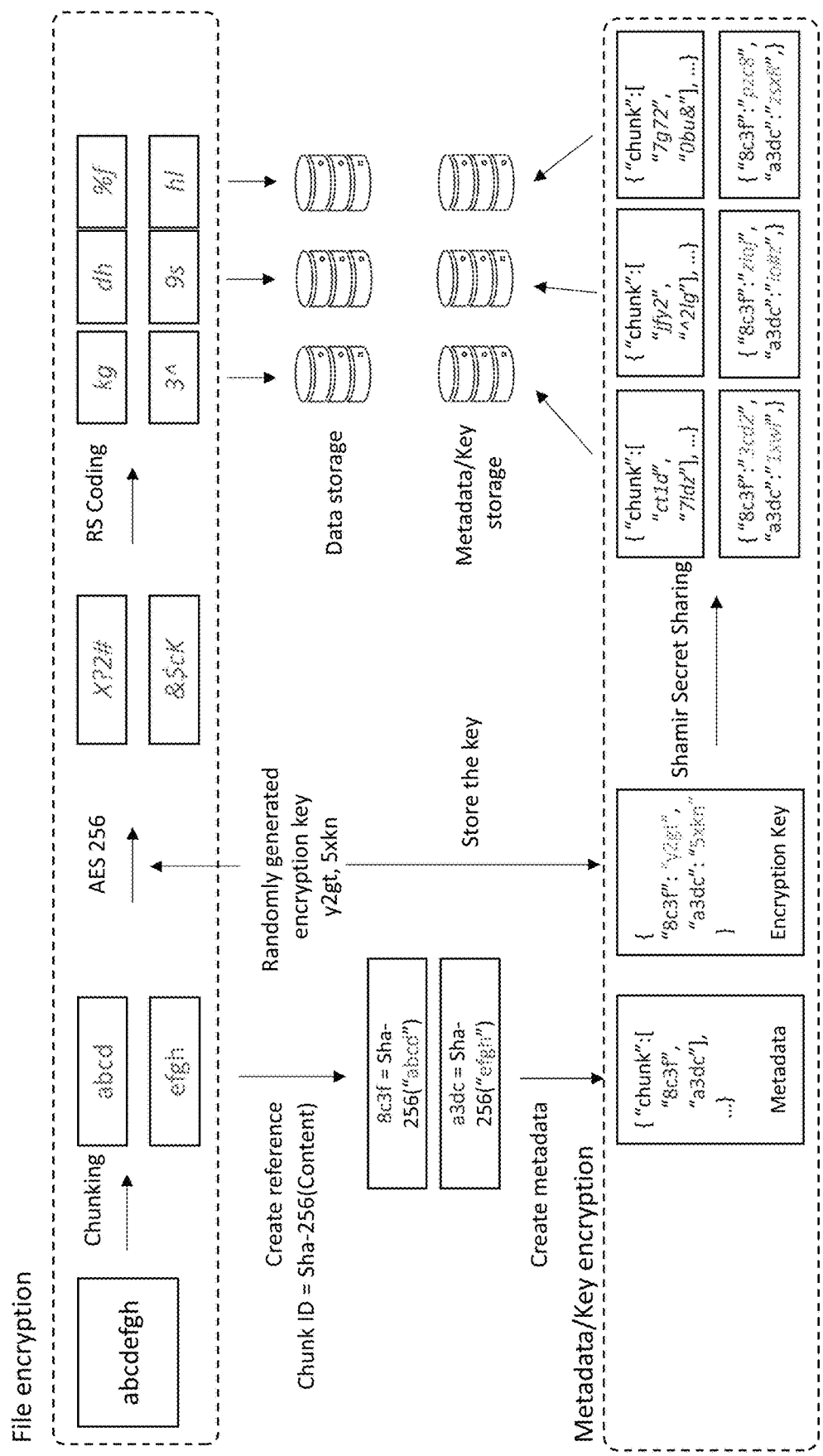
FIG. 11 shows an example of the file encryption and the metadata encryption.

FIG. 11 shows an example of the file encryption and the metadata/key encryption. The configurable parameter t and n are set 2 and 3, respectively, for file and metadata/key encryption. This example stores a file whose content is "abcdefgh" while allowing one storage failure out of three storages. The file is chunked into two pieces: "abcd" and "efgh". To make references (called chunk ID) of the chunks, we calculate SHA 256 hash of the chunk content. In this example, 8c3f=Sha-256("abcd") and a3dc=Sha-256("efgh") are the chunk IDs. Those chunk IDs are stored to the metadata (JSON format). The chunk content "abcd" and "efgh" are encrypted using a randomly generated keys "y2gt" and "5xkn" respectively. Thus, the chunk content encrypted as "X?2 #" and "&$cK". Then, we encode the encrypted chunk content using Reed-Solomon (RS) Coding. The encrypted chunk content "X?2 #" is encoded into 3 shards: "kg", "dh", and "% f". To reconstruct "X?2 #", any 2 shards out of 3 shards are required. The encrypted chunk "&$cK" is also encoded with the same way. Finally, the data shards are stored to data storage nodes.

The keys which were used to encrypt chunk content are associated with the corresponding chunk. To protect the chunk reference information (chunk IDs), we encrypt them using SSSS, which also requires any 2 of three shards to decrypt. The chunk ID "8c3f" is encrypted into "ct1d", "jfy2", and "7g72". Other chunk is encoded with the same way. The chunk ID shards are stored to metadata shard files separately. The encryption key "y2gt" is also encrypted into "3cd2", "ziaj", and "pzc8" using SSSS. Other encryption key "5xkn" is also encoded with the same way. Finally, the metadata and keys are protected by storing three different metadata shard files key shard files in different location.

Only if two out of three metadata files are accessible, we can obtain the chunk IDs "8c3f" and "a3dc". Using those chunk IDs, we can find the data/key shards and reconstruct encrypted chunk content "X?2 #" and "&$cK". Finally, we decrypt the encrypted chunk content using the encryption keys and obtain the original content "abcdefgh" by concatenating the decrypted chunks.

Data Integrity Validation.

Storing multiple shards while allowing a certain level of failures requires a process to calculate data store status, which is usually an I/O intensive task. To improve efficiency of data integrity validation, the system of the present invention uses a typical list object (or file) operation available on typical storage and operating systems only to calculate data store status. (1) fetch lists of metadata shard objects from Metadata Storages that contains file path, modification time, and file status. (2) fetch lists of data shard objects from Data Storages that contains chunk ID. (3) fetch lists of key shard objects from Key Storages that contains associated chunk ID. (4) count metadata files appearing in the list based on metadata file set whose file path and modification time are the same. If the number of metadata files in the set is n, the metadata files guarantee full resiliency from storage failures. If the number of metadata files is less than n and equal or greater than t, the corresponding metadata is decryptable and also metadata set is recoverable to have full resiliency from storage failures. If the number of metadata files is less than t, the metadata file is corrupted. (5) count data/key shards appearing in the list based on chunk ID. If the number of shards in the set is n, each chunk, metadata, and encryption key allows n-t storage failures, which is the maximum tolerance of given the parameter t and n. If the number of shards is less than n, and equal or greater than t, the chunk is decodable and also the set is recoverable to have full resiliency from storage failures. If the number of shards is less than t, the chunk is corrupted. Even though this process cannot identify which file is corrupted because it does not read metadata file content to find the map between files and chunks, overall integrity and data store status are calculated with fewer list objects operations to storages. This process can be executed at each client device and also from other centralized entities such as the Control Server.

In summary, the present invention includes numerous areas of novelty and uniqueness. Some of these include:
- File and metadata/key encryption chains; Applying RS code and SSSS to encrypted chunks of a file and chunk identifier/key contents in order to provide integration of file encoding and metadata/key encoding.
- End-to-end security; Integrating file and metadata/key encryption chains into file system operations in order to prevent security holes between file system interface and storage back ends.
- System implementation; designing and implementing system components while considering long latency networks (e.g., Internet and WAN) and user experiences.
- Client-centric architecture ensures design and implementation of end-to-end data protection solution
- Encryption chain; content encryption and metadata encryption using (t, n) threshold hold property
  - Storage efficiency and minimum size of error correction code are preferable for content encryption.
  - Randomness and theoretical cryptography are required for metadata encryption.
- AI-assisted configuration and anomaly monitoring and detection Client-centric Architecture.

Based on the definition of client, the architecture of the solution is designed to realize client-centric implementations that ensure direct communication between client and data/metadata/key storages. From the end at client to the end at the storage, the client uses the protocol and channels provided by different types of storages. The diversity of the protocols and channels are implemented at client with minimum execution of code or zero modification on the backends.

Implementing client-centric architecture for distributed storage solution is more challenging than implementing that on the server-side because the client is not a shared component like a server. Thus, the client implements processes to synchronize efficiently to overcome the limitation of the missing shard component. The present solution directly accesses metadata in distributed storages which are not designed for shared and centralized resources, thereby overcoming performance limitations, including metadata access latency by partially encoding metadata and storing a version in the client.

To implement a client, the network equipped client device requires—user data I/O interface, data processing unit, hardware storage, synchronization processing unit, and network interface. In this example, data I/O interface receives data I/O requests such as Read, Write, List, etc. The solution implements, but is not limited to, a POSIX file interface as Data I/O interface. The Data I/O interface can be the implementation of key-value storage, CRUD (Create—Read—Update—Delete) interface, etc. The data processing unit encrypts and encodes data to shards by implementing file and metadata/key encryption chain. Hardware storage stores intermediate status and data in process before sending them to the storages. The hardware storage requires access control to prevent an unauthorized entity from accessing the intermediate status and data. The synchronization processing unit is responsible for sending and receiving shards. The synchronization processing unit schedules the sending/receiving tasks based on knowledge base which stores empirical performance and configurations of the client and storages. The synchronization processing unit also decides the location of shards among available storage nodes, which is also determined based on the knowledge base. The synchronization processing unit runs AI engines to optimize parameters based on the configuration from a user. This asynchronous sending and receiving tasks in the synchronization processing unit absorbs delay by responding to the user before sending data to storages, as well as providing flexibility for extending scheduling algorithms in the future.

This solution defines three types of data storages—data storage, metadata/key storage, and metadata/key backup storage. The storages provide authentication and data I/O interfaces to the client. While data storages require a cost effective and scalable solution, metadata and key storages require fast access time. The requirements of metadata/key backup storage are identical to the metadata/key storage but located in the user domain.

Control Server is a portal to configure backend storages, manage users/devices/policies, and send commands to clients. Control Server is completely separated from data transmission channels to prevent intercepting user data in the middle. Control Server deploys configurations to clients so that clients can initiate a process by obtaining the required parameters, redirections of requests, etc.

Artificial Intelligence for Configuration.

Due to the complexity of backend interfaces and the variety of services, configuring optimal setup based on the budget while maximizing satisfaction is challenging. The present invention provides an abstraction of the configuration layer to reduce time and effort for the backend configuration. The present invention aims at optimizing operational cost, optimizing performance, and monitoring and detecting anomaly based empirical data about cost and performance of backend storages, and user's behavioral profile. Client collects event data and performs pre-processing such as anonymization, reformatting, etc. After collecting event data, client sends event data to a data collection server.

Optimizing configuration for reducing operational cost overcomes the complexity of backend storage configuration and reduces the cost of operations by distributing shards to the optimal backend storages based on data store/access cost, empirical storage performance, usage profile of peer group, pre-defined static model, etc.

The present solution also leverages the benefits of the implemented architecture to improve response. The present solution overcomes the complexity of backend storage while reducing the latency of data access and store. Unlike optimizing operational cost, distributing more shards to fast storages should have higher priority than storage cost. In addition to these two cases, the system can be configured to achieve a balanced setup between the cost optimum and the performance optimum, such as by using the simple weighted sum equation.

In the present invention, AI algorithms for behavioral analysis do not investigate user data to detect anomaly in the system. Algorithms are widely used to detect unknown attacks, but it is necessary to define normal state correctly to reduce false-positive errors. We use a behavioral analysis algorithm to find anomalies. A tightly-fitted model shows low precision rate, but a loosely fitted model shows low recall rate. Based on collected data from clients, the system updates the classifier between normal and abnormal states adaptively. The present invention leverages the characteristics of data access patterns from individual users and user groups.

The followings are the parameters that the present invention optimizes.
  Optimization 1: Indicator variable of shard store that minimizes data store cost and data access cost
  Optimization 2: Indicator variable of shard store that minimizes data upload/download completion time
  Optimization 3: Cost that minimizes shard reallocation when deploying Optimization 1 or Optimization 2
  Optimization 4: Classifier that determines normal and abnormal data access over time
  Optimization 5: Classifier that determines normal and abnormal storage access over time
  Optimization 6: Classifier that determines normal and abnormal errors from client To achieve those optimizations, the present invention will collect the followings.
  Cost and (quantitative) Service Level Agreement (SLA) of backend storages
  Empirical throughput of backend storage at each client
  Timestamp of file content operations
  Operation name
  Shard access count
  Anonymized file identifier
  Anonymized client identifier Although some common applications of the present invention are described above, it should be clearly understood that the present invention may be integrated with any network application in order to increase security, fault tolerance, anonymity, or any suitable combination of the foregoing or other related attributes. Additionally, other combinations, additions, substitutions and modifications will be apparent to the skilled artisan in view of the disclosure herein. Accordingly, the present invention is not intended to be limited by the reaction of the preferred embodiments Although the foregoing invention has been described in some detail for purposes of clarity, it will be apparent that certain changes and modifications may be made without departing from the principles of the present invention. It should be noted that there are many alternative ways of implementing both the processes and apparatuses of the present invention. Accordingly, the present embodiments are to be considered as illustrative and not restrictive, and the invention is not to be limited to the specific details given herein.

Aspects described herein can be embodied as a system, method, or computer readable medium. In some embodiments, the aspects described can be implemented in hardware, software (including firmware or the like), or combinations thereof. Some aspects can be implemented in a computer readable medium, including computer readable instructions for execution by a processor. Any combination of one or more computer readable medium(s) can be used. The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Some embodiments can be provided to an end-user through a cloud-computing infrastructure. Cloud computing generally includes the provision of scalable computing resources as a service over a network (e. g., the Internet or the like). Although a number of methods and systems are described herein, it is contemplated that a single system or method can include more than one of the above discussed subject matter. Accordingly, multiple of the above systems and methods can be used together in a single system or method.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The flowcharts and/or block diagrams in the figures illustrate the architecture, functionality, and operation of possible implementations of systems, methods, and computer program products according to various exemplary embodiments of the inventive concept. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for a processor to encrypt at least one computer file based on a combination of computational and theoretical cryptography, said computer file accessible at least on a local device, said computer file including a content data portion and an associated metadata portion, comprising the steps of:

generating a plurality of randomly generated encryption keys;

selecting at least one computer file for encryption;

parsing said content data portion of said computer file into a chain of content chunks, each said chunk assigned a chunk ID;

using computational cryptography, said computational cryptography includes use of one or more encryption algorithms and erasure coding, using said at least one encryption key per chunk, encrypting each of said content chunks;

using computational cryptography encoding and parsing each of said content chunks into a plurality of content shards;

using theoretical cryptography, said theoretical cryptography includes secret sharing methods and storing a secret in multiple shards, n, without use of an encryption key, encrypting said chunk IDs;

augmenting said metadata portion with said encrypted chunk IDs thereby forming an augmented metadata portion;

parsing said plurality of randomly generated encryption keys into a plurality of key shards;

using theoretical cryptography, encrypting said plurality of key shards;

adding said encrypted plurality of key shards into said augmented metadata portion;

parsing a subset of said metadata portion into a plurality of metadata shards;

encrypting said metadata shards;

delivering said plurality of content shards to at least a first storage location; and delivering said plurality of metadata shards to at least a second storage location;

wherein said at least a first storage location differs from said at least a second storage location, said method is configured to protect stored data from brute force attacks, and said method is configured such that decryption requires knowledge of t out of n content shards, t out of n key shards, and t out of n metadata shards, where t and n are integers.

2. The method of claim 1, where the encrypted key shards and said chunk IDs are separately stored.

3. The method of claim 1, where the steps of parsing said at least one key into a plurality of key shards and encrypting said plurality of key shards is at least partially performed using Shamir's Secret Sharing Scheme (SSSS).

4. The method of claim 1, where the computational cryptography portion of the method includes use of Reed-Solomon encoding.

5. The method of claim 1, where the step of encrypting each of said content chunks includes use of AES-256.

6. The method of claim 1, where said content data portion is fully encrypted before encoding.

7. The method of claim 1, where at least one file attribute in said metadata portion is not encrypted.

8. The method of claim 1, where at least some of said metadata portion is stored in a vault on said local device.

9. The method of claim 1, where a number, n, of each of metadata storage, key storage, and data storage is configurable and each is greater than 2.

10. The method of claim 1, where t is a number of required shards to reconstruct and n is a number of shards stored, parameters t and n of metadata shards, key shards, and data shards are each independently configurable, individually selectable by a user, and where t is an integer greater than 1 and n is n integer greater than t.

* * * * *